US008553529B2

(12) United States Patent  
Chung et al.

(10) Patent No.: US 8,553,529 B2  
(45) Date of Patent: Oct. 8, 2013

(54) METHOD AND APPARATUS FOR PERFORMING A HARQ OPERATION IN A MULTI-CARRIER SYSTEM

(75) Inventors: Jae Hoon Chung, Anyang-si (KR); So Yeon Kim, Anyang-si (KR); Yeong Hyeon Kwon, Anyang-si (KR); Hyun Soo Ko, Anyang-si (KR); Seung Hee Han, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 292 days.

(21) Appl. No.: 13/057,704

(22) PCT Filed: Aug. 7, 2009

(86) PCT No.: PCT/KR2009/004429  
§ 371 (c)(1),  
(2), (4) Date: Apr. 7, 2011

(87) PCT Pub. No.: WO2010/016750  
PCT Pub. Date: Feb. 11, 2010

(65) Prior Publication Data  
US 2011/0305134 A1    Dec. 15, 2011

Related U.S. Application Data

(60) Provisional application No. 61/086,804, filed on Aug. 7, 2008, provisional application No. 61/090,229, filed on Aug. 19, 2008, provisional application No. 61/157,912, filed on Mar. 6, 2009.

(51) Int. Cl.  
*H04W 24/04* (2009.01)

(52) U.S. Cl.  
USPC .......................................... 370/216; 370/329

(58) Field of Classification Search  
USPC .................................................. 370/329, 259  
See application file for complete search history.

(56) References Cited

U.S. PATENT DOCUMENTS

| | | | |
|---|---|---|---|
| 8,265,021 B2 * | 9/2012 | Nam et al. ..................... | 370/329 |
| 2009/0196240 A1 * | 8/2009 | Frederiksen et al. ......... | 370/329 |
| 2009/0245187 A1 * | 10/2009 | Nam et al. ..................... | 370/329 |
| 2010/0322324 A1 * | 12/2010 | Lindh et al. ................... | 375/259 |

OTHER PUBLICATIONS

3GPP TS 36.213 v8.2.0, 'E-UTRA Physical layer procedures', Mar. 2008 See pp. 28-29.  
NEC Group, 'Downlink ACK/NACK signaling for E-UTRA', TSG-RAN WG1#52 R1-074716, Nov. 5, 2007 See p. 1, fig. 1.

* cited by examiner

*Primary Examiner* — Asad Nawaz  
*Assistant Examiner* — Parth Patel  
(74) *Attorney, Agent, or Firm* — McKenna Long & Aldridge LLP

(57) ABSTRACT

A method of performing hybrid automatic repeat request (HARQ) of a user equipment (UE) in a multiple-carrier system is provided. The UE transmits uplink data on an uplink carrier. The UE receives acknowledgement (ACK)/not-acknowledgement (NACK) for the uplink data on a downlink carrier associated with the uplink carrier. Accordingly, HARQ can be supported in a multiple-carrier system.

4 Claims, 12 Drawing Sheets

METHOD AND APPARATUS FOR PERFORMING A HARQ OPERATION IN A MULTI-CARRIER SYSTEM

This application is a National Stage Entry of International Application No. PCT/KR2009/004429, filed Aug. 7, 2009, and claims the benefit of U.S. Provisional Application Ser. No. 61/086,804, filed Aug. 7, 2008, U.S. Provisional Application Ser. No. 61/090,229 filed Aug. 19, 2008, and U.S. Provisional Application Ser. No. 61/157,912, filed Mar. 6, 2009, all of which are hereby incorporated by reference in their entirety herein.

TECHNICAL FIELD

The present invention relates to wireless communications, and more particularly, to a method of performing hybrid automatic repeat request (HARQ) in a wireless communication system supporting multiple carriers.

BACKGROUND ART

Wireless communication systems are widely spread all over the world to provide various types of communication services such as voice or data. In general, the wireless communication system is a multiple access system capable of supporting communication with multiple users by sharing available system resources (e.g., bandwidth, transmit power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

In a typical wireless communication system, only one carrier is considered generally even if a bandwidth is differently set between an uplink and a downlink. The carrier is defined with a center frequency and a bandwidth. Likewise, in $3^{rd}$ generation partnership project (3GPP) long term evolution (LIE), on the basis of a single carrier, one carrier constitutes each of the uplink and the downlink, and the bandwidth of the uplink is symmetrical to the bandwidth of the downlink in general. However, except for some areas of the world, it is difficult to allocate frequencies of wide bandwidths. Therefore, as a technique for effectively using fragmented small bands, a spectrum aggregation (or carrier aggregation) technique is being developed to obtain the same effect as when a band of a wide bandwidth is logically used by aggregating a plurality of physically non-contiguous bands (i.e., frequency bands) in a frequency domain.

LTE is currently under study in the 3GPP and is one of the latest standards of mobile communication techniques. Wireless access of the LTE is referred to as an evolved-UMTS terrestrial radio access network (E-UTRAN). A 3GPP LTE system uses hybrid automatic repeat request (HARQ) to increase transmission efficiency. Downlink HARQ implies that, when a base station (BS) transmits downlink data, a user equipment (UE) transmits an acknowledgement (ACK)/not-acknowledgement (NACK) signal for the downlink data. Uplink HARQ implies that, when the UE transmits uplink data, the BS transmits an ACK/NACK signal for the uplink data. In the 3GPP LTE, when the UE transmits uplink data on a physical uplink shared channel (PUCCH), the BS sends an ACK/NACK signal on a physical hybrid-ARQ indicator channel (PHICH). The PHICH is a physical channel for carrying HARQ ACK/NACK, and is identified by the UE by using a resource used in PUSCH transmission and a cyclic shift of a demodulation-reference signal (DM-RS) used for demodulation. The section 6.9 of 3GPP TS 36.211 V8.2.0 (2008-03) "Technical specification Group Radio Access Network; Evolved Universal Terrestrial Radio Access (E-UTRA); Physical Channels and Modulation (Release 8)" may be incorporated hereby be reference.

The 3GPP LTE considers only a single carrier. Therefore, an uplink carrier used in PUSCH transmission and a downlink carrier used in PHICH transmission are unique. However, there is a problem in that it is difficult to be directly applied to the multiple-carrier system.

SUMMARY OF INVENTION

Technical Problem

The present invention provides a method and apparatus for performing hybrid automatic repeat request (HARQ) in a multiple-carrier system.

Technical Solution

According to an aspect of the present invention, a method of performing HARQ of a user equipment (UE) in a multiple-carrier system is provided. The method includes: transmitting uplink data on an uplink carrier; and receiving acknowledgement (ACK)/not-acknowledgement (NACK) for the uplink data on a downlink carrier associated with the uplink carrier, wherein the downlink carrier is associated on the basis of an index of the uplink carrier, a radio resource used for transmission of the uplink data, and a demodulation-reference signal (DM-RS) applied to the uplink data.

According to another aspect of the present invention, a method of performing HARQ of a UE in a multiple-carrier system is provided. The method includes: receiving information regarding a downlink carrier associated with an uplink carrier; transmitting uplink data on a physical uplink shared channel (PUSCH) of the uplink carrier; and receiving ACK/NACK for the uplink data on a physical hybrid-ARQ indicator channel (PHICH) of the downlink carrier, wherein a radio resource used by the PHICH is identified by a PHICH group index and a sequence index used in a PHICH channel indicated by the PHICH group index, and the PHICH group index and the sequence index are determined based on the lowest physical resource block used for transmission of the PUSCH and a cyclic shift index of a DM-RS used for transmission of the PUSCH. According to another aspect of the present invention, there is provided a UE including: a radio frequency (RF) unit for transmitting and receiving a radio signal; and a processor coupled to the RF unit, wherein the processor transmits uplink data on a uplink carrier, receives information regarding a downlink carrier mapped to the uplink carrier by using a mapping rule, receives ACK/NACK for the uplink data on the downlink carrier, wherein the mapping rule is determined based on an index of the uplink carrier, the lowest physical resource block index in the uplink carrier, and a cyclic shift index of a DM-RS applied to the uplink data.

Advantageous Effects

According to the present invention, an uplink carrier and a downlink carrier can be flexibly allocated in a multiple-carrier system. An operation for performing hybrid automatic repeat request (HARQ) is provided. The present invention can apply to the multiple-carrier system while maintaining an operation of a legacy 3rd generation partnership project (3GPP) long term evolution (LTE) system.

MODE FOR INVENTION

3rd generation partnership project (3GPP) long term evolution (LTE) is a part of an evolved-UMTS (E-UMTS) using evolved-universal terrestrial radio access network (E-UTRAN). The 3GPP LTE employs orthogonal frequency division multiple access (OFDMA) in a downlink and employs single carrier-frequency division multiple access (SC-FDMA) in an uplink. LTE-advanced (LTE-A) is an evolution of the 3GPP LTE.

For clarity of explanation, the following description will focus on the 3GPP LTE/LTE-A. However, the technical features of the present invention are not limited thereto.

Figure 1:
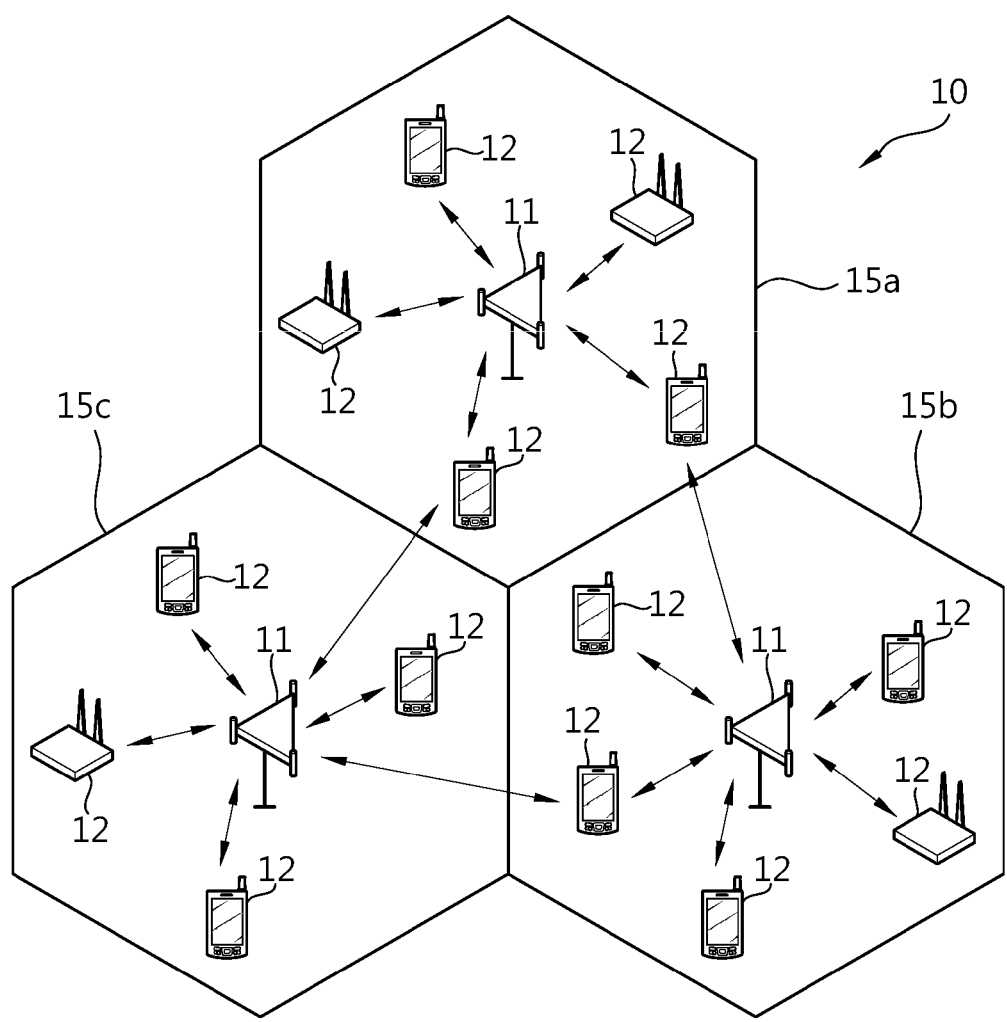
FIG. 1 shows a wireless communication system.

FIG. 1 shows a wireless communication system.

Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (also referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes communication from the BS to the UE, and an uplink (UL) denotes communication from the UE to the BS. In the DL, a transmitter may be a part of the BS, and a receiver may be a part of the UE. In the UL, the transmitter may be a part of the UE, and the receiver may be a part of the BS.

Figure 2:
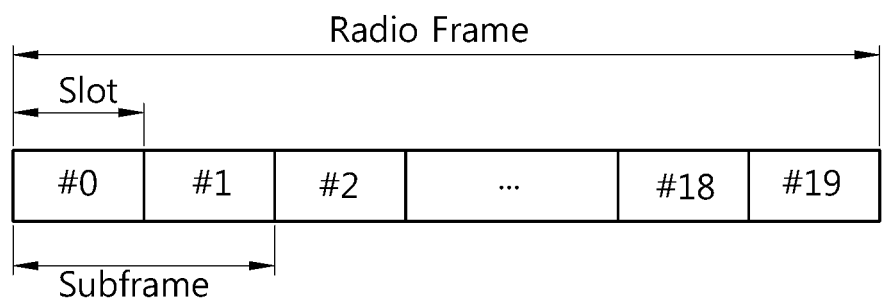
FIG. 2 shows a structure of a radio frame in 3rd generation partnership project (3GPP) long term evolution (LTE) system.

FIG. 2 shows a structure of a radio frame in 3GPP LTE.

Referring to FIG. 2, the radio frame consists of 10 subframes. One subframe consists of 2 slots. A time required for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in a time domain and includes a plurality of resource blocks (RBs) in a frequency domain. Since the 3GPP LTE uses DL OFDMA, the OFDM symbol is for representing one symbol period, and can be referred to as an SC-FDMA symbol or a symbol period according to a multiple-access scheme. The RB includes a plurality of contiguous subcarriers in one slot as a resource assignment unit. The structure of the radio frame is for exemplary purpose only, and the number of subframes included in the radio frame or the number of slots included in the subframe and the number of OFDM symbols included in the slot can change variously.

Figure 3:
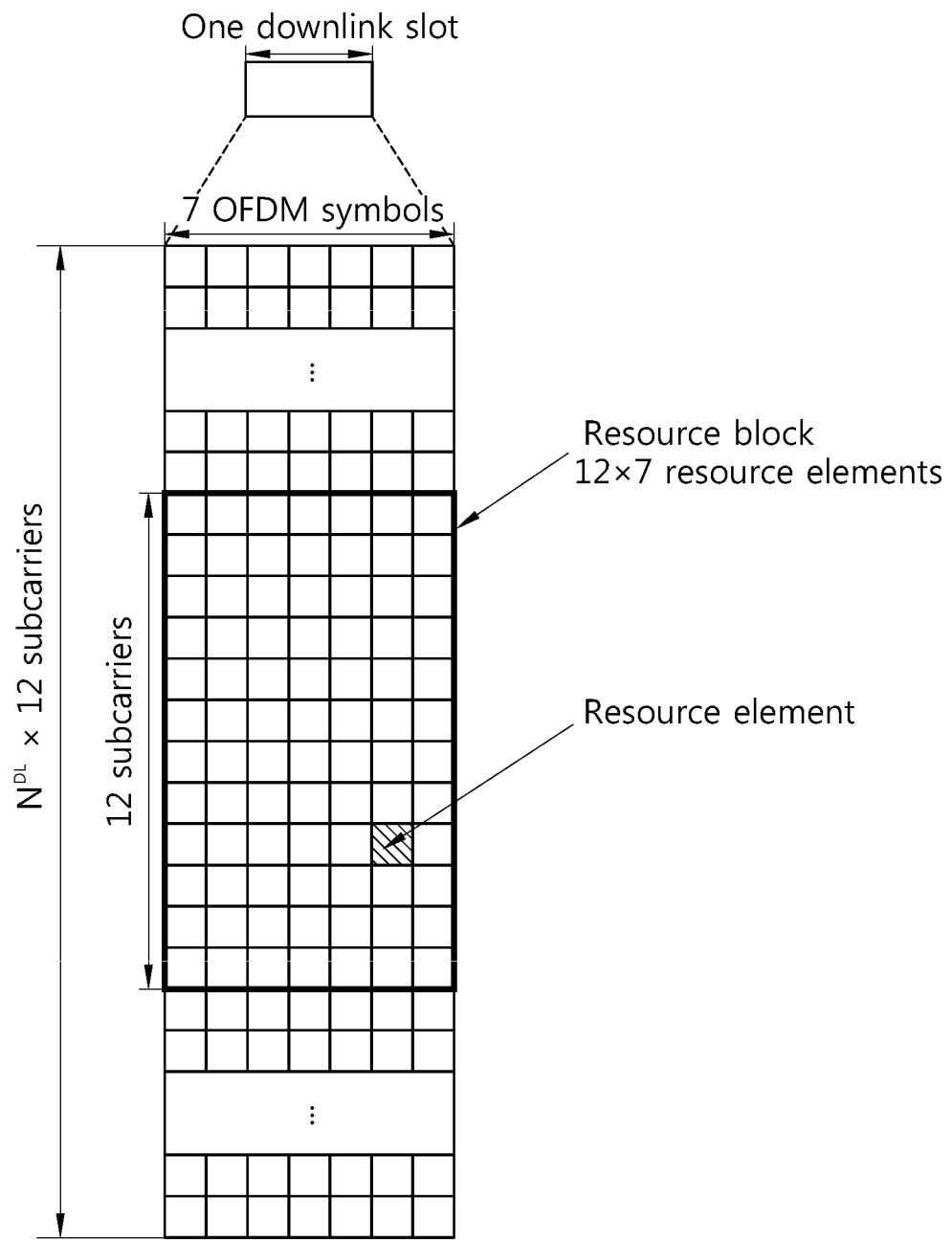
FIG. 3 is a diagram showing an example of a resource grid for one downlink slot.

FIG. 3 is a diagram showing an example of a resource grid for one DL slot. Referring to FIG. 3, the DL slot includes a plurality of OFDM symbols in a time domain. Although it is described herein that one DL slot includes 7 OFDM symbols, and one RB includes 12 subcarriers in a frequency domain, the present invention is not limited thereto.

Each element on the resource grid is referred to as a resource element (RE). One RB includes 12×7 REs. An RB group is an aggregation of four RBs. The number $N^{DL}$ of RBs included in the DL slot depends on a DL transmission bandwidth defined in a cell.

Figure 4:
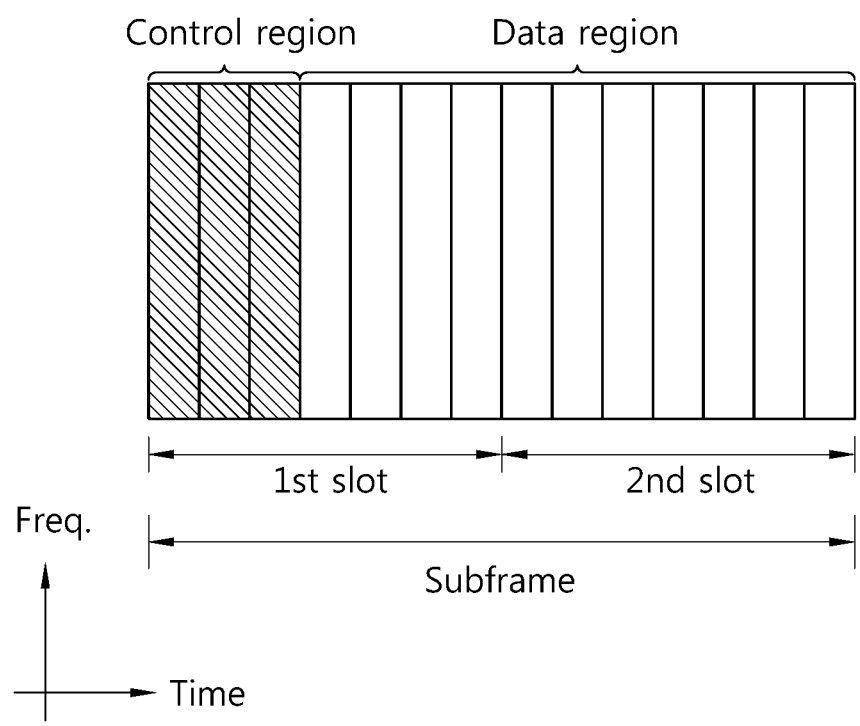
FIG. 4 shows an example of a downlink subframe structure.

FIG. 4 shows an example of a DL subframe structure.

Referring to FIG. 4, a subframe includes two slots. Up to three preceding OFDM symbols of a 1st slot in the subframe correspond to a control region to which control channels are assigned. The remaining OFDM symbols correspond to a data region to which a physical downlink shared channel (PDSCH) is assigned.

Examples of DL control channels used in 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of the subframe carries information regarding the number of OFDM symbols (i.e., a size of the control region) used for transmission of the control channels in the subframe.

Control information transmitted on the PDCCH is referred to as downlink control information (DCI). The DCI indicates UL resource allocation information, DL resource allocation information, and UL transmit power control commands for any UE group, etc.

The PHICH carries an acknowledgement (ACK)/not-acknowledgement (NACK) signal for UL hybrid automatic repeat request (HARQ). That is, an ACK/NACK signal for UL data transmitted by a UE is transmitted on the PHICH. A PHICH duration denotes the number of OFDM symbols that can be used for PHICH transmission.

The PDCCH can carry a downlink shared channel (DL-SCH)'s resource allocation and transmission format, an uplink shared channel (UL-SCH)'s resource allocation information, paging information regarding a paging channel (PCH), system information regarding the DL-SCH, a resource allocation of a higher-layer control message such as a random access response transmitted on the PDSCH, an aggregation of transmit power control commands for individual UEs in any UE group, activation of a voice over Internet (VoIP), etc. A plurality of PDCCHs can be transmitted in the control region, and a UE can monitor the plurality of PDCCHs. The PDCCH is transmitted on an aggregation of one or several consecutive control channel elements (CCEs). The CCE is a logical allocation unit used to provide a coding rate depending on a state of a radio channel to the PDCCH. The CCE corresponds to a plurality of resource element groups. According to an association relation between the number of CCEs and a coding rate provided by the CCEs, a format of the PDCCH and the number of bits of an available PDCCH are determined. Control information transmitted on the PDCCH is referred to as downlink control information (DCI). The wireless communication system can support UL and/or DL hybrid automatic repeat request (HARQ).

Figure 5:
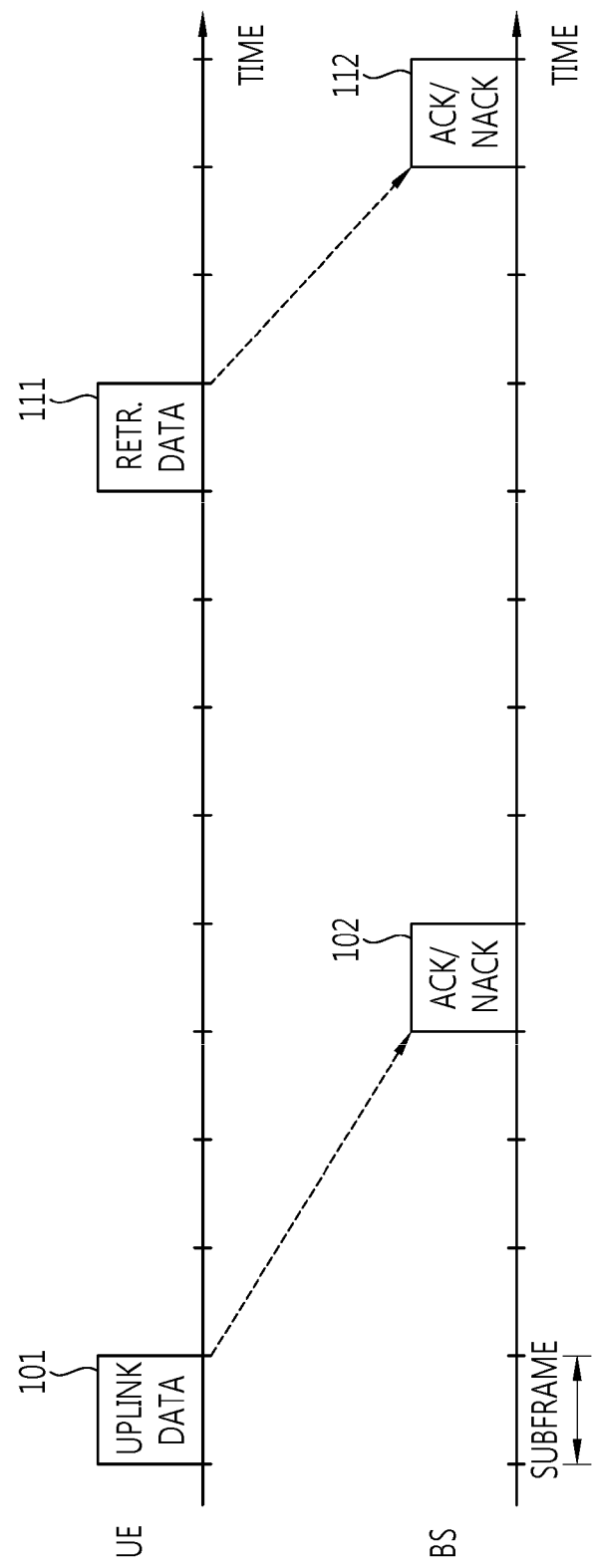
FIG. 5 shows uplink hybrid automatic repeat request (HARQ).

FIG. 5 shows UL HARQ. Upon receiving UL data 101 from a UE on a physical uplink shared channel (PUSCH), a BS transmits an ACK/NACK signal 102 on a PHICH after a specific time elapses. The ACK/NACK signal 102 corresponds to an ACK signal when the UL data 101 is successfully decoded, and corresponds to a NACK signal when the UL data 101 fails in decoding. Upon receiving the NACK signal, the UE can transmit retransmission data 111 for the UL data 101 until ACK information is received or until up to a maximum number of retransmission attempts. The BS can transmit an ACK/NACK signal 112 for the retransmission data 111 on the PHICH.

Figure 6:
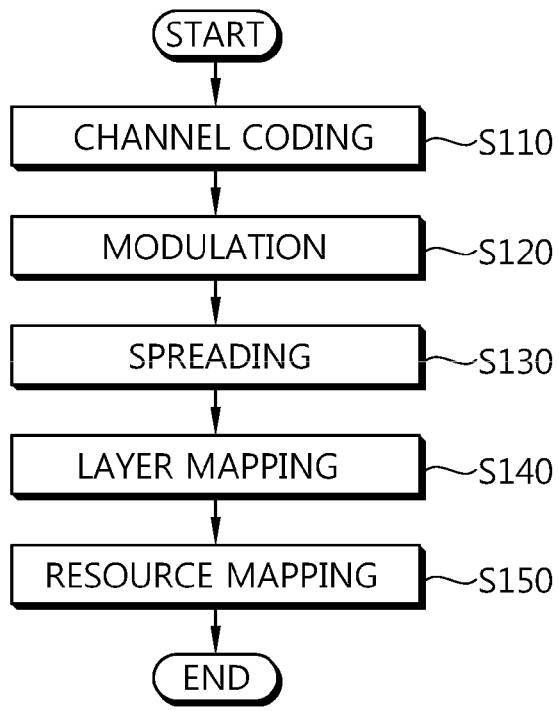
FIG. 6 is a flowchart showing a configuration of a physical hybrid-ARQ indicator channel (PHICH).

FIG. 6 is a flowchart showing a configuration of a PHICH. The PHICH carries an ACK/NACK signal corresponding to a PUSCH for a UE. The section 6.9 of 3GPP TS 36.211 V8.2.0 (2008-03) "Technical specification Group Radio Access Network; Evolved Universal Terrestrial Radio Access (E-UTRA); Physical Channels and Modulation (Release 8)" can be incorporated herein by reference. Referring to FIG. 6, in step S110, the 1-bit ACK/NACK signal is subjected to channel coding by using repetition coding at a code rate of ⅓. In step S120, the ACK/NACK signal coded with a 3-bit codeword is mapped to 3 modulation symbols by using binary phase shift keying (BPSK). In step S130, the modulation symbols are spread by using a spreading factor (SF) $N^{PHICH}_{SF}$ and an orthogonal sequence. The number of orthogonal sequences used in the spreading is double of $N^{PHICH}_{SF}$ to apply I/Q multiplexing. $2N^{PHICH}_{SF}$ PHICHs which are spread by using $2N^{PHICH}_{SF}$ orthogonal sequences are defined as one PHICH group. PHICHs belonging to the same PHICH group are identified using different orthogonal sequences. In step S140, layer mapping is performed on the spread symbols according to a rank. In step S150, the layer-mapped symbols are mapped to respective resource elements.

According to the section 6.9 of 3GPP TS 36.211 V8.2.0 (2008-03), a PHICH resource corresponding to a PUSCH is defined by using $I^{lowest\_index}_{PRB\_RA}$ which is the lowest physical resource block (PRB) index of a resource used in the PUSCH and $n_{DMRS}$ which is a cyclic shift of a demodulation reference signal (DM-RS) used in the PUSCH. The DM-RS is a reference signal used for demodulation of data transmitted on the PUSCH. More specifically, the PHICH resource is known by an index pair $(n^{group}_{PHICH}, n^{seq}_{PHICH})$. $n^{group}_{PHICH}$ denotes a PHICH number, and $n^{seq}_{PHICH}$ denotes an orthogonal sequence index in the PHICH group. $n^{group}_{PHICH}$ and $n^{seq}_{PHICH}$ are given by Equation 1 below.

$$n_{PHICH}^{group} = (l_{PRB\_RA}^{lowest\_index} + n_{DMRS}) \bmod N_{PHICH}^{group}$$

$$n_{PHICH}^{seq} = (\lfloor l_{PRB\_RA}^{lowest\_index} / N_{PHICH}^{group} \rfloor + n_{DMRS}) \bmod 2N_{SF}^{PHICH}$$ [Equation 1]

In Equation 1 above, 'mod' denotes a modulo operation.

$n^{group}_{PHICH}$ has a value between 0 and $(N^{group}_{PHICH}-1)$, and the number $N^{group}_{PHICH}$ of PHICH groups is defined by Equation 2 below.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$ [Equation 2]

In Equation 2 above, $N_g \in \{1/6, 1/2, 1, 2\}$ is defined by using a higher-layer message (e.g., a radio resource control (RRC) message).

An orthogonal sequence used in the PHICH is shown in Table 1 below.

TABLE 1

| | Orthogonal sequence | |
|---|---|---|
| Sequence index $n_{PHICH}^{seq}$ | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Now, a multiple-carrier system will be described.

A 3GPP LTE system supports a case where a DL bandwidth is set differently from a UL bandwidth under the assumption that one carrier is used. This implies that the 3GPP LTE is supported only when the DL bandwidth is different from the UL bandwidth in a condition where one carrier is defined for each of a DL and a UL. For example, the 3GPP LTE system can support up to 20 MHz, and the UL bandwidth and the DL bandwidth may be different from each other, but in this case, only one carrier is supported for the UL and the DL.

Spectrum aggregation (also referred to as bandwidth aggregation or carrier aggregation) is for supporting a plurality of carriers. The spectrum aggregation is introduced to support an increasing throughput, to prevent cost rising caused by introduction of a broadband radio frequency (RF) device, and to ensure compatibility with a legacy system. For example, when 5 carriers are assigned with a granularity of a carrier unit having a bandwidth of 20 MHz, up to 100 MHz can be supported.

The spectrum aggregation can be classified into contiguous spectrum aggregation achieved between contiguous carriers in a frequency domain and non-contiguous spectrum aggregation achieved between non-contiguous carriers. The number of DL aggregated carriers may be different from the number of UL aggregated carriers. Symmetric aggregation is achieved when the number of DL carriers is equal to the number of UL carriers. Asymmetric aggregation is achieved when the number of DL carriers is different from the number of UL carriers.

Figure 7:
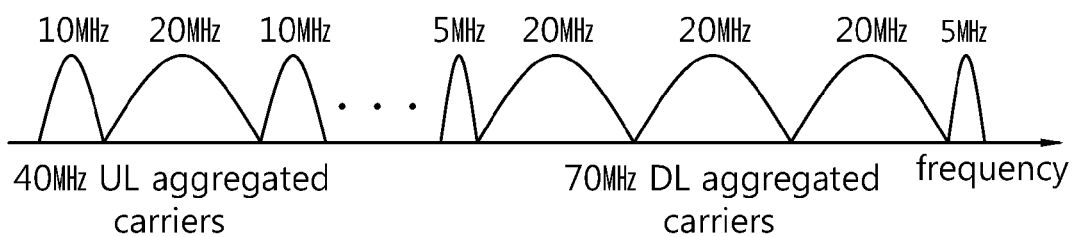
FIG. 7 shows an example of asymmetric aggregation.

FIG. 7 shows an example of asymmetric aggregation. Referring to FIG. 7, multiple carriers may have different sizes (i.e., bandwidths) from one another. For example, when three carriers are used to construct a 40 MHz band in a UL, the band may consist of two 10 MHz carriers and one 20 MHz carrier. When five carriers are used to construct a 70 MHz band in a DL, the band may consist of two 5 MHz carriers and three 20 MHz carriers.

Hereinafter, a multiple-carrier system refers to a system supporting multiple carriers based on spectrum aggregation. The multiple-carrier system may use contiguous spectrum aggregation and/or non-contiguous spectrum aggregation, and may use any one of symmetric aggregation and asymmetric aggregation.

Figure 8:
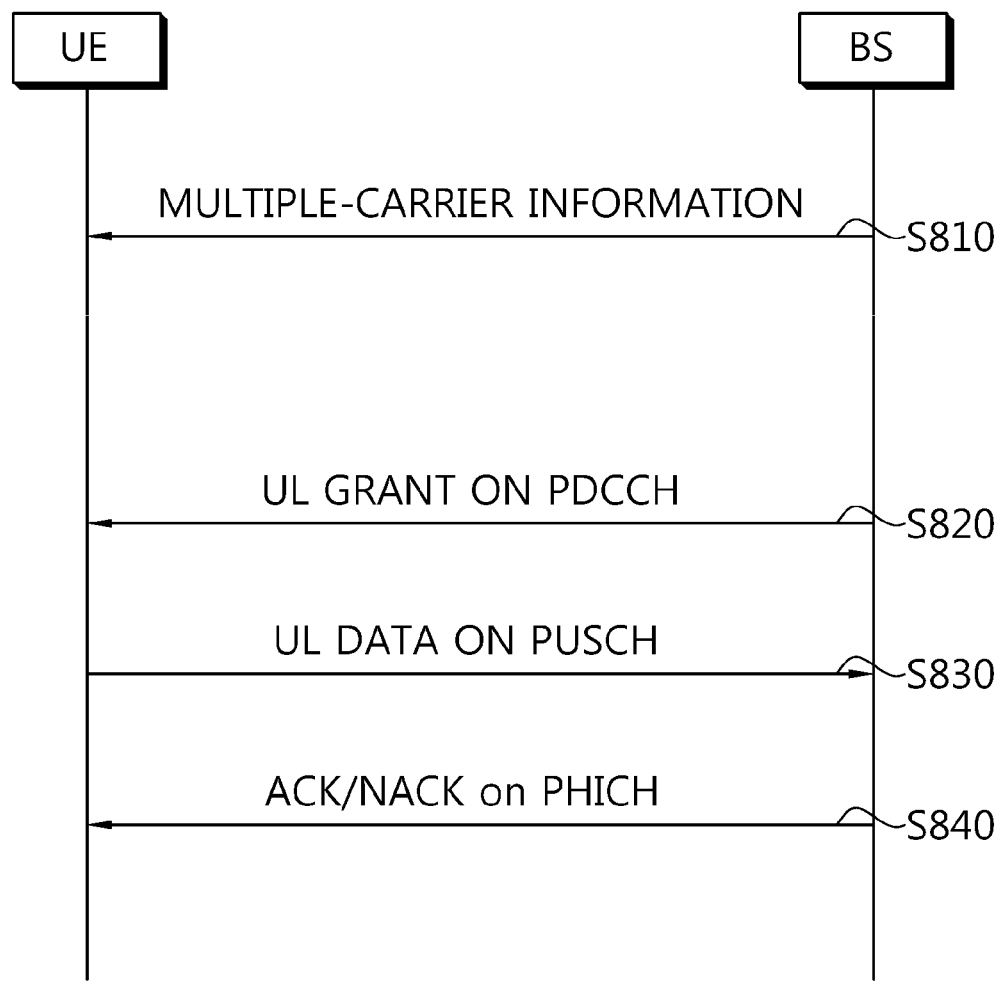
FIG. 8 is a flowchart showing a method of performing HARQ in a multiple-carrier system.

In the multiple-carrier system, a UE can receive UL resource allocation information on a control channel of any one DL carrier among a plurality of DL carriers. However, there is a problem in that the UE cannot know a specific UL carrier for which the UL resource allocation information is transmitted among the plurality of UL carriers. In addition, there is another problem in that a specific DL carrier of which a control channel (i.e., PHICH) is used for ACK/NACK transmission cannot be known as to data transmitted by the UE to a BS on any one UL carrier among the plurality of UL carriers. To solve these problems, there is a need to determine a mapping method between a UL carrier and a DL carrier and a method of performing HARQ. Now, the mapping method between the UL carrier and the DL carrier in the multiple-carrier system and the method of performing HARQ will be described. FIG. 8 is a flowchart showing a method of performing HARQ in a multiple-carrier system. A UE receives multiple-carrier information from a BS (step S810). The multiple-carrier information is a higher-layer signal such as an RRC message or a part of system information, and may be transmitted by the BS. The multiple-carrier information may include the number of UL/DL carriers and/or the number of PHICH groups.

The UE receives a UL grant from the BS on a PDCCH (step S820). The UL grant may include a resource allocation for a PUSCH, a cyclic shift index $n_{DMRS}$ for a DM-RS, and/or a DL carrier index for PHICH transmission. The UL grant may include a UL carrier index for the PUSCH, and in this case, a DL carrier for PHICH transmission may be obtained from the UL carrier index.

The UE transmits UL data on the PUSCH by using the resource allocation of the UL grant (step S830).

The BS transmits ACK/NACK for the UL data on a PHICH (step S840). The PHICH may be identified from the resource used for PUSCH transmission and the cyclic shift index for the DM-RS.

The DL carrier for PHICH transmission may be obtained implicitly or explicitly by using the UL grant or a higher-layer message. A relation between carriers for PUSCH and PHICH transmission is referred to as a mapping relation between the DL carrier and the UL carrier. The BS may report the mapping relation between the DL carrier and the UL carrier to the UE by using L1/L2 signaling or broadcast information or other various means.

Now, PHICH allocation and carrier mapping will be described in detail. First, a required resource amount is defined by the number of PHICH groups, and then a carrier used for PHICH transmission, a PHICH group, and a sequence used in the PHICH group are defined. Symbols to be used in the following description are summarized below.

$N^{UL}_{carrier}$: The number of UL carriers used for PUSCH transmission $N^{DL}_{carrier}$: The number of DL carriers $N^{PHICH}_{carrier}$: The number of DL carriers allocated for DL PHICH transmission $n^{PHICH}_{carrier}$: A DL carrier index used for PHICH transmission $n^{group}_{PHICH}$: A PHICH group index in a corresponding carrier $n^{seq}_{PHICH}$: A PHICH sequence index in a corresponding carrier If k denotes an index of a UL carrier, k has a value in the range of $0, 1, 2, \ldots, (N^{UL}_{carrier}-1)$. If l denotes an index of a DL carrier capable of PHICH transmission, l has a value in the range of $0, 1, 2, \ldots, (N^{PHICH}_{carrier}-1)$. The index k or l may be an index of an absolute frequency domain in which allocation is achieved from a physically low frequency band to a high frequency band, or may be an index of a relative frequency domain determined logically irrespective of the physical frequency band.

<When there is No Mapping Relation Between a UL Carrier and a DL Carrier>

This is a method of implicitly or explicitly determining a DL carrier for PHICH transmission from a UL carrier for PUSCH transmission when there is no mapping relation between the UL carrier and the DL carrier.

Figure 9:
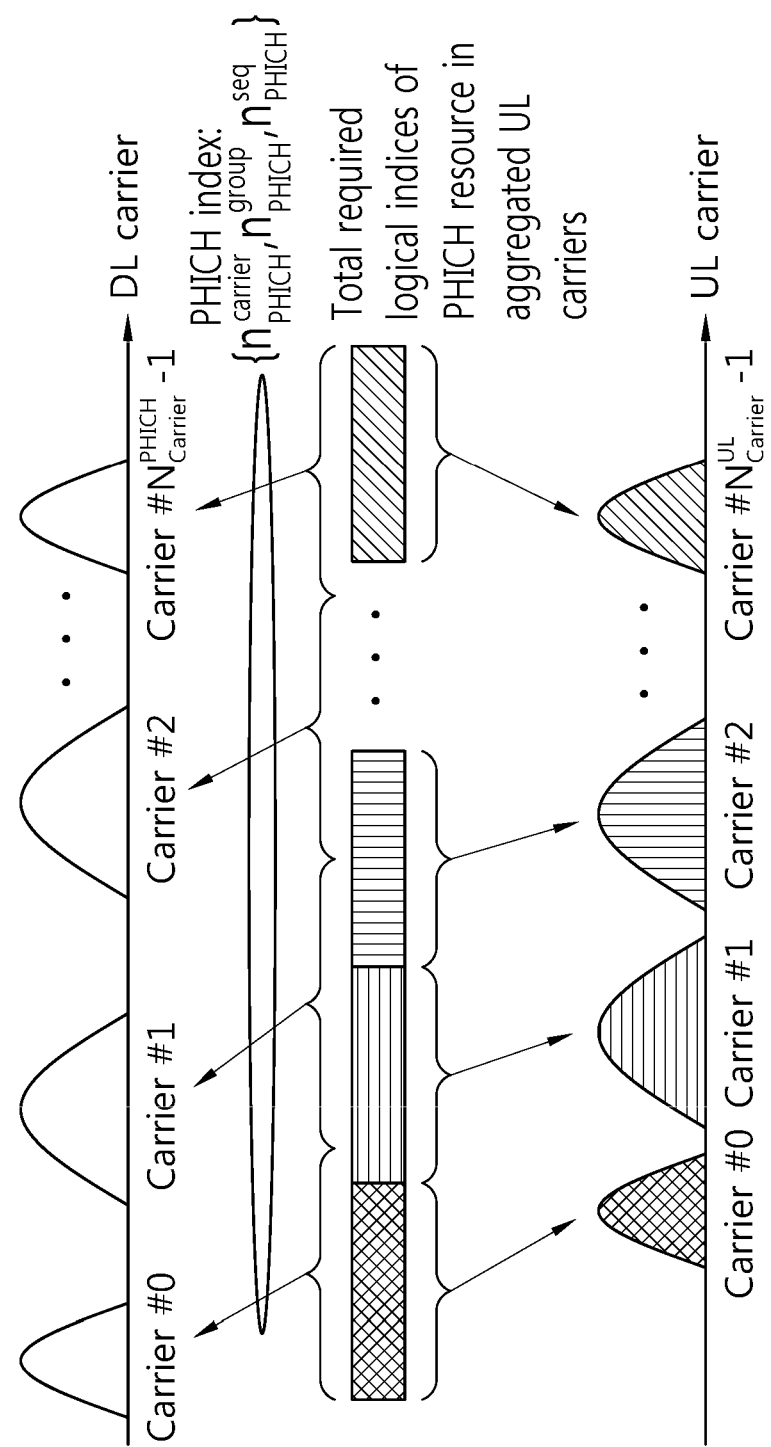
FIG. 9 shows a method of determining a PHICH resource according to an embodiment of the present invention.

FIG. 9 shows a method of determining a PHICH resource according to an embodiment of the present invention. Logical indices are sequentially assigned to RBs capable of PUSCH transmission from each of UL carriers. For example, if a carrier #0 has 10 RBs and a carrier #1 has 5 RBs, logical indices may be assigned from 0 to 14. The logical indices are evenly or unevenly divided according to the number of DL carriers capable of PHICH transmission, and a PHICH resource index (e.g., a PHICH group number) is obtained for each DL carrier in a group of the divided logical indices. Herein, the RB is only an example of a resource allocation unit of the PUSCH, and thus the resource allocation unit for assigning the logical indices may change variously.

A PHICH carrier index $n^{PHICH}_{carrier}$, a PHICH group index $n^{group}_{PHICH}$, and a PHICH sequence index $n^{seq}_{PHICH}$ are obtained based on a carrier index used for UL transmission, a PUSCH resource for PHICH identification, and a cyclic shift index of a DM-RS. Three parameters (i.e., $n^{PHICH}_{carrier}$, $n^{group}_{PHICH}$, and $n^{seq}_{PHICH}$) for determining a PHICH resource are referred to as a PHICH index.

A plurality of UL carriers are arranged based on logical indices, and thereafter DL carriers for the PHICH are mapped according to the logical indices. Instead of mapping UL carriers directly to the DL carriers, the UL carriers are re-arranged logically according to RBs, and the PHICH index is obtained according to a re-arranged order.

First, for simple explanation, it is assumed that the number $N^{DL}_{carrier}$ of DL carriers is equal to the number $N^{PHICH}_{carrier}$ of DL carriers allocated for DL PHICH transmission. Further, resources are allocated to the PUSCH in an RB unit.

The total number $N^{UL}_{RB\_tot}$ of RBs available in UL carriers can be defined by Equation 3 below.

$$N^{UL}_{RB\_tot} = \sum_{k=0}^{N^{UL}_{carrier}-1} N^{UL}_{RB}(k) \quad \text{[Equation 3]}$$

In Equation 3 above, $N^{UL}_{RB}(k)$ denotes the number of RBs capable of PUSCH transmission on a UL carrier having an index k.

When PHICH resources are evenly distributed to a plurality of DL carriers, the number of PHICH groups assigned for each DL carrier can be defined by Equation 4 below.

[Equation 4]

$$N^{group}_{PHICH}(l) = \begin{cases} \lceil N_g \cdot (N^{UL}_{RB\_tot}/(8 \cdot N^{PHICH}_{carrier})) \rceil & \text{for normal cyclic prefix} \\ 2 \cdot \lceil N_g \cdot (N^{UL}_{RB\_tot}/(8 \cdot N^{PHICH}_{carrier})) \rceil & \text{for extended cyclic prefix} \end{cases}$$

In Equation 4 above, $N^{group}_{carrier}(l)$ denotes the number of PHICH groups of a DL carrier having an index l. $\lceil x \rceil$ is a ceil function that returns the smallest integer greater than x. $\lfloor x \rfloor$ is a floor function that returns the greatest integer less than x. $N_g$ may be provided by a higher layer signal and used to perform scaling on the number of PHICH groups according to a currently required condition. $N_g$ may be given as an m-bit value. For example, m may have any one of values 2, 3, and 4. $N_g$ may be used as a scaling factor when multiple codewords are used in a UL.

A bandwidth of UL carriers allocated for UL PUSCH transmission may be inconsistent, or a bandwidth of DL carriers allocated for DL PHICH transmission may be inconsistent. In this case, the value $N_g$ applied to each DL carrier allocated for DL PHICH transmission may change. This can be expressed by Equation 5 below.

$$N^{group}_{PHICH}(l) = \begin{cases} \lceil N_g(l) \cdot (N^{UL}_{RB\_tot}/(8 \cdot N^{PHICH}_{carrier})) \rceil & \text{for normal cyclic prefix} \\ 2 \cdot \lceil N_g(l) \cdot (N^{UL}_{RB\_tot}/(8 \cdot N^{PHICH}_{carrier})) \rceil & \text{for extended cyclic prefix} \end{cases}$$ [Equation 5]

In Equation 5 above, $N_g(l)$ denotes $N_g$ at the DL carrier index l. When multiple codewords can be transmitted on a UL carrier allocated for UL PUSCH transmission, the number of PHICH groups of each DL carrier can be expressed by Equation 6 below.

$$N^{group}_{PHICH}(l) = \begin{cases} \lceil N_g \cdot (N^{UL}_{RB\_tot} \cdot N_C/(8 \cdot N^{PHICH}_{carrier})) \rceil & \text{for normal cyclic prefix} \\ 2 \cdot \lceil N_g \cdot (N^{UL}_{RB\_tot} \cdot N_C/(8 \cdot N^{PHICH}_{carrier})) \rceil & \text{for extended cyclic prefix} \end{cases}$$ or $$N^{group}_{PHICH}(l) = \begin{cases} \lceil N_g(l) \cdot (N^{UL}_{RB\_tot} \cdot N_C/(8 \cdot N^{PHICH}_{carrier})) \rceil & \text{for normal cyclic prefix} \\ 2 \cdot \lceil N_g(l) \cdot (N^{UL}_{RB\_tot} \cdot N_C/(8 \cdot N^{PHICH}_{carrier})) \rceil & \text{for extended cyclic prefix} \end{cases}$$ [Equation 6]

In Equation 6 above, $N_c$ denotes the number of codewords transmitted on each UL carrier. The same result can also be obtained when the value $N_g$ is used for scaling control instead of applying $N_c$.

If the number of codewords transmitted for each UL carrier changes, the number $N^{group}_{PHICH}(l)$ of PHICH groups for the carrier having the index l can be expressed by Equation 7 below.

$$N^{group}_{PHICH}(l) = \begin{cases} \lceil N_g \cdot (N^{UL}_{RB\_tot} \cdot N_C(l)/(8 \cdot N^{PHICH}_{carrier})) \rceil & \text{for normal cyclic prefix} \\ 2 \cdot \lceil N_g \cdot (N^{UL}_{RB\_tot} \cdot N_C(l)/(8 \cdot N^{PHICH}_{carrier})) \rceil & \text{for extended cyclic prefix} \end{cases}$$ or $$N^{group}_{PHICH}(l) = \begin{cases} \lceil N_g(l) \cdot (N^{UL}_{RB\_tot} \cdot N_C(l)/(8 \cdot N^{PHICH}_{carrier})) \rceil & \text{for normal cyclic prefix} \\ 2 \cdot \lceil N_g(l) \cdot (N^{UL}_{RB\_tot} \cdot N_C(l)/(8 \cdot N^{PHICH}_{carrier})) \rceil & \text{for extended cyclic prefix} \end{cases}$$ [Equation 7]

In Equation 7 above, $N_c(l)$ denotes N, at the DL carrier index l. Unlike the aforementioned example, the number of PHICH groups of each DL carrier may be determined based on the total number of resource blocks that can be used in DL carriers and the total number of DL carriers. The total number $N^{DL}_{RB\_tot}$ of RBs that can be used in the DL carriers can be defined by Equation 8 below.

$$N^{DL}_{RB\_tot} = \sum_{m=0}^{N^{DL}_{carrier}-1} N^{DL}_{RB}(m) \text{ or}$$

$$N^{DL}_{RB\_tot} = \sum_{m=0}^{N^{PHICH}_{carrier}-1} N^{DL}_{RB}(m)$$ [Equation 8]

In Equation 8 above, $N^{DL}_{RB}(m)$ denotes the number of RBs of a DL carrier having a carrier index m. Equation 8 above implies that $N^{DL}_{RB\_tot}$ can be determined according to the total number $N^{DL}_{carrier}$ of DL carriers or the number $N^{PHICH}_{carrier}$ of DL carriers that can be used for PHICH transmission. If $N^{DL}_{carrier}$ is equal to $N^{PHICH}_{carrier}$, m has a value in the range from 0 to ($N^{PHICH}_{carrier}-1$).

When $N^{PHICH}_{carrier}$ PHICH transmissions are evenly attempted in a distributed manner for each DL carrier with respect to $N^{DL}_{RB\_tot}$, the number of PHICH groups of the DL carrier having the index l can be defined by Equation 9 below.

$$N^{group}_{PHICH}(l) = \begin{cases} \lceil N_g \cdot (N^{DL}_{RB\_tot}/(8 \cdot N^{PHICH}_{carrier})) \rceil & \text{for normal cyclic prefix} \\ 2 \cdot \lceil N_g \cdot (N^{DL}_{RB\_tot}/(8 \cdot N^{PHICH}_{carrier})) \rceil & \text{for extended cyclic prefix} \end{cases}$$ [Equation 9]

In Equation 9 above, $N_g$ may be provided by a higher-layer signal and used to perform scaling on the number of PHICH groups according to a currently required condition. $N_g$ may be given as an m-bit value. For example, m may have any one of values 2, 3, and 4. $N_g$ may be used as a scaling factor when multiple codewords are used in a UL.

A bandwidth of UL carriers may be inconsistent, or a bandwidth of DL carriers may be inconsistent. In this case, the value $N_g$ applied to each DL carrier may change. This can be expressed by Equation 10 below.

$$N^{group}_{PHICH}(l) = \begin{cases} \lceil N_g(l) \cdot (N^{DL}_{RB\_tot}/(8 \cdot N^{PHICH}_{carrier})) \rceil & \text{for normal cyclic prefix} \\ 2 \cdot \lceil N_g(l) \cdot (N^{DL}_{RB\_tot}/(8 \cdot N^{PHICH}_{carrier})) \rceil & \text{for extended cyclic prefix} \end{cases}$$ [Equation 10]

In Equation 10 above, $N_g(l)$ denotes $N_g$ at the DL carrier index l. When multiple codewords can be transmitted on a carrier allocated for UL PUSCH transmission, the number of PHICH groups can be expressed by Equation 11 below.

$$N^{group}_{PHICH}(l) = \begin{cases} \lceil N_g \cdot (N^{DL}_{RB\_tot} \cdot N_C/(8 \cdot N^{PHICH}_{carrier})) \rceil & \text{for normal cyclic prefix} \\ 2 \cdot \lceil N_g \cdot (N^{DL}_{RB\_tot} \cdot N_C/(8 \cdot N^{PHICH}_{carrier})) \rceil & \text{for extended cyclic prefix} \end{cases}$$ or [Equation 11]

-continued $$N_{PHICH}^{group}(l) = \begin{cases} \lceil N_g \cdot (N_{RB\_tot}^{DL} \cdot N_C/(8 \cdot N_{carrier}^{PHICH})) \rceil & \text{for normal cyclic prefix} \\ 2 \cdot \lceil N_g(l) \cdot (N_{RB\_tot}^{DL} \cdot N_C/(8 \cdot N_{carrier}^{PHICH})) \rceil & \text{for extended cyclic prefix} \end{cases}$$

In Equation 11 above, $N_c$ denotes the number of codewords transmitted on each UL carrier. The same result can also be obtained when the value $N_g$ is used for scaling control instead of applying $N_c$. If a different number of codewords can be transmitted on each carrier allocated for UL PUSCH transmission, the number of PHICH groups for each DL carrier can be expressed by Equation 12 below.

[Equation 12]

$$N_{PHICH}^{group}(l) = \begin{cases} \lceil N_g \cdot (N_{RB\_tot}^{DL} \cdot N_C(l)/(8 \cdot N_{carrier}^{PHICH})) \rceil & \text{for normal cyclic prefix} \\ 2 \cdot \lceil N_g \cdot (N_{RB\_tot}^{DL} \cdot N_C(l)/(8 \cdot N_{carrier}^{PHICH})) \rceil & \text{for extended cyclic prefix} \end{cases}$$

or $$N_{PHICH}^{group}(l) = \begin{cases} \lceil N_g(l) \cdot (N_{RB\_tot}^{DL} \cdot N_C(l)/(8 \cdot N_{carrier}^{PHICH})) \rceil & \text{for normal cyclic prefix} \\ 2 \cdot \lceil N_g(l) \cdot (N_{RB\_tot}^{DL} \cdot N_C(l)/(8 \cdot N_{carrier}^{PHICH})) \rceil & \text{for extended cyclic prefix} \end{cases}$$

In Equation 12 above, $N_c(l)$ denotes $N_c$ at the DL carrier index l. A ratio of the number of RBs that can be used in a DL and the number of RBs that can be used in a UL is defined as $R_{RB}^{UL/DL}=N_{RB\_tot}^{UL}/N_{RB\_tot}^{DL}$. When using the RB ratio, Equation 9 to Equation 12 above can be re-expressed by Equation 13 below.

$$N_{PHICH}^{group}(l) = \quad [\text{Equation 13}]$$

$$\begin{cases} \lceil N_g \cdot (N_{RB\_tot}^{DL} \cdot R_{RB}^{UL/DL}/(8 \cdot N_{carrier}^{PHICH})) \rceil & \text{for normal cyclic prefix} \\ 2 \cdot \lceil N_g \cdot (N_{RB\_tot}^{DL} \cdot R_{RB}^{UL/DL}/(8 \cdot N_{carrier}^{PHICH})) \rceil & \text{for extended cyclic prefix} \end{cases}$$

$$N_{PHICH}^{group}(l) =$$

$$\begin{cases} \lceil N_g(l) \cdot (N_{RB\_tot}^{DL} \cdot R_{RB}^{UL/DL}/(8 \cdot N_{carrier}^{PHICH})) \rceil & \text{for normal cyclic prefix} \\ 2 \cdot \lceil N_g(l) \cdot (N_{RB\_tot}^{DL} \cdot R_{RB}^{UL/DL}/(8 \cdot N_{carrier}^{PHICH})) \rceil & \text{for extended cyclic prefix} \end{cases}$$

$$N_{PHICH}^{group}(l) =$$

$$\begin{cases} \lceil N_g \cdot (N_{RB\_tot}^{DL} \cdot R_{RB}^{UL/DL} \cdot N_C/(8 \cdot N_{carrier}^{PHICH})) \rceil & \text{for normal cyclic prefix} \\ 2 \cdot \lceil N_g \cdot (N_{RB\_tot}^{DL} \cdot R_{RB}^{UL/DL} \cdot N_C/(8 \cdot N_{carrier}^{PHICH})) \rceil & \text{for extended cyclic prefix} \end{cases}$$

$$N_{PHICH}^{group}(l) =$$

$$\begin{cases} \lceil N_g(l) \cdot (N_{RB\_tot}^{DL} \cdot R_{RB}^{UL/DL} \cdot N_C/(8 \cdot N_{carrier}^{PHICH})) \rceil & \text{for normal cyclic prefix} \\ 2 \cdot \lceil N_g(l) \cdot (N_{RB\_tot}^{DL} \cdot R_{RB}^{UL/DL} \cdot N_C/(8 \cdot N_{carrier}^{PHICH})) \rceil & \text{for extended cyclic prefix} \end{cases}$$

$$N_{PHICH}^{group}(l) =$$

$$\begin{cases} \lceil N_g \cdot (N_{RB\_tot}^{DL} \cdot R_{RB}^{UL/DL} \cdot N_C(l)/(8 \cdot N_{carrier}^{PHICH})) \rceil & \text{for normal cyclic prefix} \\ 2 \cdot \lceil N_g \cdot (N_{RB\_tot}^{DL} \cdot R_{RB}^{UL/DL} \cdot N_C(l)/(8 \cdot N_{carrier}^{PHICH})) \rceil & \text{for extended cyclic prefix} \end{cases}$$

$$N_{PHICH}^{group}(l) =$$

$$\begin{cases} \lceil N_g(l) \cdot (N_{RB\_tot}^{DL} \cdot R_{RB}^{UL/DL} \cdot N_C(l)/(8 \cdot N_{carrier}^{PHICH})) \rceil & \text{for normal cyclic prefix} \\ 2 \cdot \lceil N_g(l) \cdot (N_{RB\_tot}^{DL} \cdot R_{RB}^{UL/DL} \cdot N_C(l)/(8 \cdot N_{carrier}^{PHICH})) \rceil & \text{for extended cyclic prefix} \end{cases}$$

Equation 13 above is a list of candidate equations capable of calculating the number of PHICH groups by using the RB ratio.

$N_g$ is not used for scaling of a ratio of the total number of RBs that can be used in the UL and the total number of RBs that can be used in the DL, but is used to perform scaling for regulating the total number of PHICH groups. Therefore, the number of possible cases of determining the value $N_g$ is decreased, and thus the number of bits of the value $N_g$ may be further decreased than that used in the conventional method.

Equation 9 to Equation 13 above are for defining the number $N_{PHICH}^{group}(l)$ of PHICH groups for each DL carrier. In order for a UE to identify a PHICH resource in a multiple-carrier system, three parameters are required, i.e., a DL carrier index $n_{carrier}^{PHICH}$ for PHICH transmission, a PHICH group index $n_{PHICH}^{group}$ in a DL carrier, and a PHICH sequence index $n_{PHICH}^{seq}$ in a PHICH group. A BS sends ACK/NACK by configuring the PHICH defined by using the three parameters. The UE identifies the PHICH transmitted to the UE by using the three parameters. Hereinafter, a PHICH indexing method for defining the three parameters is proposed.

First, $n_{carrier}^{PHICH}$ is obtained based on a value calculated by adding a sum of the number of available RBs of UL carriers having a lower index than an index k of a UL carrier used for PUSCH transmission to the lowest PRB index of a PUSCH allocated at the UL carrier k used for current PUSCH transmission (this value is referred to as an aggregated PRB index). The PHICH carrier index $n_{carrier}^{PHICH}$ is determined by sequentially applying the number of PHICH resources for each DL carrier in an ascending order of a DL carrier index. The PHICH group index $n_{PHICH}^{group}$ in the DL carrier of the index $n_{carrier}^{PHICH}$ can be obtained based on a result of subtracting a value obtained by multiplying a PHICH resource allocated for each PHICH carrier by previous DL PHICH carrier indices from the aggregated PRB index and then adding a cyclic shift index of a DM-RS.

The PHICH sequence index $n_{PHICH}^{seq}$ in the PHICH group can be obtained similarly to a method of obtaining the PHICH group index $n_{PHICH}^{group}$.

Now, the method of obtaining the three parameters will be described in detail. A PHICH carrier index for a UL carrier having an index k for PUSCH transmission can be determined by any one of equations of Equation 14 below.

$$n_{PHICH}^{carrier} = \left\lceil \frac{\sum_{p=0}^{k-1} N_{RB}^{UL}(p) + I_{PRB\_RA}^{lowest\_index}}{\frac{N_{RB\_tot}^{UL}}{N_{carrier}^{PHICH}}} \right\rceil$$ [Equation 14]

$$n_{PHICH}^{carrier} = \left\lceil \frac{\sum_{p=0}^{k-1} N_{RB}^{UL}(p) + I_{PRB\_RA}^{lowest\_index}}{\left\lceil \frac{N_{RB\_tot}^{UL}}{N_{carrier}^{PHICH}} \right\rceil} \right\rceil$$

$$n_{PHICH}^{carrier} = \left\lceil \frac{\sum_{p=0}^{k-1} N_{RB}^{UL}(p) + I_{PRB\_RA}^{lowest\_index}}{\left\lfloor \frac{N_{RB\_tot}^{UL}}{N_{carrier}^{PHICH}} \right\rfloor} \right\rceil$$

In Equation 14 above, $N^{UL}_{RB}(p)$ denotes the number of RBs of a UL carrier having an index p. $I^{lowest\_index}_{PRB\_RA}$ denotes the lowest PRB index of a PUSCH transmitted on the UL carrier having the index k. $N^{UL}_{RB\_tot}$ denotes the total number of RBs of UL carriers. $N^{PHICH}_{carrier}$ denotes the total number of DL carriers that can be used for PHICH transmission. Since the number of PHICH resources for each DL carrier allocated for PHICH transmission can be expressed in three types, i.e.

$$\frac{N_{RB\_tot}^{UL}}{N_{carrier}^{PHICH}}, \left\lceil \frac{N_{RB\_tot}^{UL}}{N_{carrier}^{PHICH}} \right\rceil, \left\lfloor \frac{N_{RB\_tot}^{UL}}{N_{carrier}^{PHICH}} \right\rfloor$$

and Equation 14 above is expressed in three types.

An aggregated PRB index $$I_{aggregated} = \sum_{p=0}^{k-1} N_{RB}^{UL}(p) + I_{PRB\_RA}^{lowest\_index}$$

is a value calculated by adding a sum of the number of available RBs of UL carriers having a lower index than the index k of the UL carrier used for PUSCH transmission to the lowest PRB index of a PUSCH allocated at the UL carrier k used for current PUSCH transmission.

The PHICH group index $n^{group}_{PHICH}$ in the DL carrier of the index $n^{PHICH}_{carrier}$ can be obtained based on a result of subtracting a value obtained by multiplying a PHICH resource allocated for each PHICH carrier by previous DL PHICH carrier indices from the aggregated PRB index and then adding a cyclic shift index of a DM-RS. This can be expressed by Equation 15 below.

[Equation 15]

$$n_{PHICH}^{group} = \left( \sum_{p=0}^{k-1} N_{RB}^{UL}(p) + I_{PRB\_RA}^{lowest\_index} - n_{PHICH}^{carrier} \cdot \frac{N_{RB\_tot}^{UL}}{N_{carrier}^{PHICH}} + n_{RS}^{seq} \right)$$

$$\mod N_{PHICH}^{group}(n_{PHICH}^{carrier}) + I_{PHICH} \cdot N_{PHICH}^{group}(n_{PHICH}^{carrier})$$

$$n_{PHICH}^{group} = \left( \sum_{p=0}^{k-1} N_{RB}^{UL}(p) + I_{PRB\_RA}^{lowest\_index} - n_{PHICH}^{carrier} \cdot \left\lceil \frac{N_{RB\_tot}^{UL}}{N_{carrier}^{PHICH}} \right\rceil + n_{RS}^{seq} \right)$$

$$\mod N_{PHICH}^{group}(n_{PHICH}^{carrier}) + I_{PHICH} \cdot N_{PHICH}^{group}(n_{PHICH}^{carrier})$$

$$n_{PHICH}^{group} = \left( \sum_{p=0}^{k-1} N_{RB}^{UL}(p) + I_{PRB\_RA}^{lowest\_index} - n_{PHICH}^{carrier} \cdot \left\lfloor \frac{N_{RB\_tot}^{UL}}{N_{carrier}^{PHICH}} \right\rfloor + n_{RS}^{seq} \right)$$

$$\mod N_{PHICH}^{group}(n_{PHICH}^{carrier}) + I_{PHICH} \cdot N_{PHICH}^{group}(n_{PHICH}^{carrier})$$

In Equation 15 above, $N^{PHICH}_{SF}$ denotes a spreading factor used in PHICH modulation, and $n^{seq}_{RS}$ denotes a cyclic shift index of a DM-RS. $I_{PHICH}$ is 1 when PUSCH transmission is performed in a subframe 4 or a subframe 9 in a TDD UL/DL configuration 0, and otherwise is 0. Regarding $I_{PHICH}$, Table 2 below shows a structure of a radio frame that can be configured according to an arrangement of a UL subframe and a DL subframe in a 3GPP LTE TDD system. In Table 2, 'D' denotes a DL subframe, 'U' denotes a UL subframe, and 'S' denotes a special subframe. In a UL-DL configuration 0 of Table 2, $I_{PHICH}$ is 1 when PUSCH transmission is performed in subframes #4 and #9, and otherwise is 0.

TABLE 2

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

The PHICH sequence index $n^{seq}_{PHICH}$ in the PHICH group can be obtained by Equation 16 below, similarly to the method of obtaining the PHICH group index $n^{group}_{PHICH}$.

[Equation 16]

$$n_{PHICH}^{seq} = \left\{ \left[ \left( \sum_{p=0}^{k-1} N_{RB}^{UL}(p) + I_{PRB\_RA}^{lowest\_index} - n_{PHICH}^{carrier} \cdot \frac{N_{RB\_tot}^{UL}}{N_{carrier}^{PHICH}} \right) \middle/ N_{PHICH}^{group}(n_{PHICH}^{carrier}) \right] + n_{RS}^{seq} \right\} \mod 2N_{SF}^{PHICH}$$

$$n_{PHICH}^{seq} = \left\{ \left[ \left( \sum_{p=0}^{k-1} N_{RB}^{UL}(p) + I_{PRB\_RA}^{lowest\_index} - n_{PHICH}^{carrier} \cdot \left\lceil \frac{N_{RB\_tot}^{UL}}{N_{carrier}^{PHICH}} \right\rceil \right) \middle/ N_{PHICH}^{group}(n_{PHICH}^{carrier}) \right] + n_{RS}^{seq} \right\} \mod 2N_{SF}^{PHICH}$$

$$n_{PHICH}^{seq} = \left\{ \left[ \left( \sum_{p=0}^{k-1} N_{RB}^{UL}(p) + I_{PRB\_RA}^{lowest\_index} - n_{PHICH}^{carrier} \cdot \left\lfloor \frac{N_{RB\_tot}^{UL}}{N_{carrier}^{PHICH}} \right\rfloor \right) \middle/ N_{PHICH}^{group}(n_{PHICH}^{carrier}) \right] + n_{RS}^{seq} \right\} \mod 2N_{SF}^{PHICH}$$

In another embodiment, in a case where multiple-codeword transmission is achieved when data is transmitted on a UL carrier, a cyclic shift index of a DM-RS used in each codeword transmission can be mapped differently for each codeword transmission. The cyclic shift index of the DM-RS for each codeword is denoted by $n^{seq}_{RS}(v)$ (where v is a codeword index). In this case, $n^{PHICH}_{carrier}(v)$, $n^{group}_{PHICH}(v)$, and $n^{seq}_{PHICH}(v)$ based on the codeword index v can be determined by Equation 17 below.

[Equation 17]

$$n^{carrier}_{PHICH}(v) = \left\lfloor \frac{\sum_{p=0}^{k-1} N^{UL}_{RB}(p) + I^{lowest\_index}_{PRB\_RA}}{\frac{N^{UL}_{RB\_tot}}{N^{PHICH}_{carrier}}} \right\rfloor$$

$$n^{carrier}_{PHICH}(v) = \left\lfloor \frac{\sum_{p=0}^{k-1} N^{UL}_{RB}(p) + I^{lowest\_index}_{PRB\_RA}}{\left\lfloor \frac{N^{UL}_{RB\_tot}}{N^{PHICH}_{carrier}} \right\rfloor} \right\rfloor$$

$$n^{carrier}_{PHICH}(v) = \left\lceil \frac{\sum_{p=0}^{k-1} N^{UL}_{RB}(p) + I^{lowest\_index}_{PRB\_RA}}{\left\lfloor \frac{N^{UL}_{RB\_tot}}{N^{PHICH}_{carrier}} \right\rfloor} \right\rceil$$

$$n^{group}_{PHICH}(v) =$$

$$\left(\sum_{p=0}^{k-1} N^{UL}_{RB}(p) + I^{lowest\_index}_{PRB\_RA} - n^{carrier}_{PHICH}(v) \cdot \frac{N^{UL}_{RB\_tot}}{N^{PHICH}_{carrier}} + n^{seq}_{RS}(v)\right) mod N^{group}_{PHICH}(n^{carrier}_{PHICH}(v)) +$$

$$I_{PHICH} \cdot N^{group}_{PHICH}(n^{carrier}_{PHICH}(v))$$

$$n^{group}_{PHICH}(v) = \left(\sum_{p=0}^{k-1} N^{UL}_{RB}(p) + I^{lowest\_index}_{PRB\_RA} - n^{carrier}_{PHICH}(v) \cdot \left\lfloor \frac{N^{UL}_{RB\_tot}}{N^{PHICH}_{carrier}} \right\rfloor + n^{seq}_{RS}(v)\right) mod N^{group}_{PHICH}(n^{carrier}_{PHICH}(v)) + I_{PHICH} \cdot N^{group}_{PHICH}(n^{carrier}_{PHICH}(v))$$

$$n^{group}_{PHICH}(v) = \left(\sum_{p=0}^{k-1} N^{UL}_{RB}(p) + I^{lowest\_index}_{PRB\_RA} - n^{carrier}_{PHICH}(v) \cdot \left\lfloor \frac{N^{UL}_{RB\_tot}}{N^{PHICH}_{carrier}} \right\rfloor + n^{seq}_{RS}(v)\right) mod N^{group}_{PHICH}(n^{carrier}_{PHICH}(v)) + I_{PHICH} \cdot N^{group}_{PHICH}(n^{carrier}_{PHICH}(v))$$

$$n^{seq}_{PHICH}(v) = \left\{\left[\left(\sum_{p=0}^{k-1} N^{UL}_{RB}(p) + I^{lowest\_index}_{PRB\_RA} - n^{carrier}_{PHICH}(v) \cdot \frac{N^{UL}_{RB\_tot}}{N^{PHICH}_{carrier}}\right) \right/ N^{group}_{PHICH}(n^{carrier}_{PHICH}(v))\right] + n^{seq}_{RS}(v)\right\} mod 2N^{PHICH}_{SF}$$

-continued $$n^{seq}_{PHICH}(v) = \left\{\left[\left(\sum_{p=0}^{k-1} N^{UL}_{RB}(p) + I^{lowest\_index}_{PRB\_RA} - n^{carrier}_{PHICH}(v) \cdot \left\lfloor \frac{N^{UL}_{RB\_tot}}{N^{PHICH}_{carrier}} \right\rfloor\right) \right/ N^{group}_{PHICH}(n^{carrier}_{PHICH}(v))\right] + n^{seq}_{RS}(v)\right\} mod 2N^{PHICH}_{SF}$$

$$n^{seq}_{PHICH}(v) = \left\{\left[\left(\sum_{p=0}^{k-1} N^{UL}_{RB}(p) + I^{lowest\_index}_{PRB\_RA} - n^{carrier}_{PHICH}(v) \cdot \left\lfloor \frac{N^{UL}_{RB\_tot}}{N^{PHICH}_{carrier}} \right\rfloor\right) \right/ N^{group}_{PHICH}(n^{carrier}_{PHICH}(v))\right] + n^{seq}_{RS}(v)\right\} mod 2N^{PHICH}_{SF}$$

In Equation 17 above, $n^{seq}_{RS}(v)$ is a cyclic shift index of a DM-RS having a codeword index v. The equations of Equation 17 are identical to those of Equation 14 to Equation 16 except that the codeword index is denoted by v. In another embodiment, $n^{PHICH}_{carrier}(v)$ uses Equation 17 above, whereas $n^{group}_{PHICH}(v)$ and $n^{seq}_{PHICH}(v)$ may further include a function f(v) for assigning an offset in addition to $n^{seq}_{RS}(v)$. For example, the function may be f(v)=v or f(v)=α·v. Herein, α is a constant, and may be given by a higher-layer signal. When using the offset function f(v), $n^{group}_{PHICH}(v)$ and $n^{seq}_{PHICH}(v)$ can be expressed by Equation 18 below.

[Equation 18]

$$n^{group}_{PHICH}(v) =$$

$$\left(\sum_{p=0}^{k-1} N^{UL}_{RB}(p) + I^{lowest\_index}_{PRB\_RA} - n^{carrier}_{PHICH}(v) \cdot \frac{N^{UL}_{RB\_tot}}{N^{PHICH}_{carrier}} + n^{seq}_{RS}(v) + f(v)\right) mod N^{group}_{PHICH}(n^{carrier}_{PHICH}(v)) +$$

$$I_{PHICH} \cdot N^{group}_{PHICH}(n^{carrier}_{PHICH}(v))$$

$$n^{group}_{PHICH}(v) = \left(\sum_{p=0}^{k-1} N^{UL}_{RB}(p) + I^{lowest\_index}_{PRB\_RA} - n^{carrier}_{PHICH}(v) \cdot \left\lfloor \frac{N^{UL}_{RB\_tot}}{N^{PHICH}_{carrier}} \right\rfloor + n^{seq}_{RS}(v) + f(v)\right) mod N^{group}_{PHICH}(n^{carrier}_{PHICH}(v)) + I_{PHICH} \cdot N^{group}_{PHICH}(n^{carrier}_{PHICH}(v))$$

$$n^{group}_{PHICH}(v) = \left(\sum_{p=0}^{k-1} N^{UL}_{RB}(p) + I^{lowest\_index}_{PRB\_RA} - n^{carrier}_{PHICH}(v) \cdot \left\lfloor \frac{N^{UL}_{RB\_tot}}{N^{PHICH}_{carrier}} \right\rfloor + n^{seq}_{RS}(v) + f(v)\right) mod N^{group}_{PHICH}(n^{carrier}_{PHICH}(v)) + I_{PHICH} \cdot N^{group}_{PHICH}(n^{carrier}_{PHICH}(v))$$

$n_{PHICH}^{seq}(v) =$ $$\left\{\left[\left(\sum_{p=0}^{k-1} N_{RB}^{UL}(p) + I_{PRB\_RA}^{lowest\_index} - n_{PHICH}^{carrier}(v) \cdot \frac{N_{RB\_tot}^{UL}}{N_{carrier}^{PHICH}}\right) \middle/ N_{PHICH}^{group}(n_{PHICH}^{carrier}(v))\right] + n_{RS}^{seq}(v) + f(v)\right\} \mod 2 N_{SF}^{PHICH}$$

$$n_{PHICH}^{seq}(v) = \left\{\left[\left(\sum_{p=0}^{k-1} N_{RB}^{UL}(p) + I_{PRB\_RA}^{lowest\_index} - n_{PHICH}^{carrier}(v) \cdot \left[\frac{N_{RB\_tot}^{UL}}{N_{carrier}^{PHICH}}\right]\right) \middle/ N_{PHICH}^{group}(n_{PHICH}^{carrier}(v))\right] + n_{RS}^{seq}(v) + f(v)\right\} \mod 2 N_{SF}^{PHICH}$$

$$n_{PHICH}^{seq}(v) = \left\{\left[\left(\sum_{p=0}^{k-1} N_{RB}^{UL}(p) + I_{PRB\_RA}^{lowest\_index} - n_{PHICH}^{carrier}(v) \cdot \left\lfloor\frac{N_{RB\_tot}^{UL}}{N_{carrier}^{PHICH}}\right\rfloor\right) \middle/ N_{PHICH}^{group}(n_{PHICH}^{carrier}(v))\right] + n_{RS}^{seq}(v) + f(v)\right\} \mod 2 N_{SF}^{PHICH}.$$

In another embodiment, $n_{PHICH}^{group}(v)$ and $n_{PHICH}^{seq}(v)$ can be expressed by Equation 19 below, by multiplying a function $f(v)$ for assigning scaling by $n_{RS}^{seq}(v)$ for each codeword index v.

$n_{PHICH}^{group}(v) =$ [Equation 19]

$$\left(\sum_{p=0}^{k-1} N_{RB}^{UL}(p) + I_{PRB\_RA}^{lowest\_index} - n_{PHICH}^{carrier}(v) \cdot \frac{N_{RB\_tot}^{UL}}{N_{carrier}^{PHICH}} + n_{RS}^{seq}(v) \cdot f(v)\right) \mod N_{PHICH}^{group}(n_{PHICH}^{carrier}(v)) + I_{PHICH} \cdot N_{PHICH}^{group}(n_{PHICH}^{carrier}(v))$$

$$n_{PHICH}^{group}(v) = \left(\sum_{p=0}^{k-1} N_{RB}^{UL}(p) + I_{PRB\_RA}^{lowest\_index} - n_{PHICH}^{carrier}(v) \cdot \left[\frac{N_{RB\_tot}^{UL}}{N_{carrier}^{PHICH}}\right] + n_{RS}^{seq}(v) \cdot f(v)\right) \mod N_{PHICH}^{group}(n_{PHICH}^{carrier}(v)) + I_{PHICH} \cdot N_{PHICH}^{group}(n_{PHICH}^{carrier}(v))$$

$$n_{PHICH}^{group}(v) = \left(\sum_{p=0}^{k-1} N_{RB}^{UL}(p) + I_{PRB\_RA}^{lowest\_index} - n_{PHICH}^{carrier}(v) \cdot \left\lfloor\frac{N_{RB\_tot}^{UL}}{N_{carrier}^{PHICH}}\right\rfloor + n_{RS}^{seq}(v) \cdot f(v)\right) \mod N_{PHICH}^{group}(n_{PHICH}^{carrier}(v)) + I_{PHICH} \cdot N_{PHICH}^{group}(n_{PHICH}^{carrier}(v))$$

$n_{PHICH}^{seq}(v) =$ $$\left\{\left[\left(\sum_{p=0}^{k-1} N_{RB}^{UL}(p) + I_{PRB\_RA}^{lowest\_index} - n_{PHICH}^{carrier}(v) \cdot \frac{N_{RB\_tot}^{UL}}{N_{carrier}^{PHICH}}\right) \middle/ N_{PHICH}^{group}(n_{PHICH}^{carrier}(v))\right] + n_{RS}^{seq}(v) \cdot f(v)\right\} \mod 2 N_{SF}^{PHICH}$$

$$n_{PHICH}^{seq}(v) = \left\{\left[\left(\sum_{p=0}^{k-1} N_{RB}^{UL}(p) + I_{PRB\_RA}^{lowest\_index} - n_{PHICH}^{carrier}(v) \cdot \left[\frac{N_{RB\_tot}^{UL}}{N_{carrier}^{PHICH}}\right]\right) \middle/ N_{PHICH}^{group}(n_{PHICH}^{carrier}(v))\right] + n_{RS}^{seq}(v) \cdot f(v)\right\} \mod 2 N_{SF}^{PHICH}$$

$$n_{PHICH}^{seq}(v) = \left\{\left[\left(\sum_{p=0}^{k-1} N_{RB}^{UL}(p) + I_{PRB\_RA}^{lowest\_index} - n_{PHICH}^{carrier}(v) \cdot \left\lfloor\frac{N_{RB\_tot}^{UL}}{N_{carrier}^{PHICH}}\right\rfloor\right) \middle/ N_{PHICH}^{group}(n_{PHICH}^{carrier}(v))\right] + n_{RS}^{seq}(v) \cdot f(v)\right\} \mod 2 N_{SF}^{PHICH}$$

The scaling function $f(v)$ can be defined variously. For example, $f(v)$ may be any one of $f(v)=v$, $f(v)=\alpha \cdot v + 1$, $f(v)=\alpha \cdot (v+1)$, and $f(v)=\alpha \cdot v$. Herein, $\alpha$ is a constant, and may be given by a higher-layer signal.

In the aforementioned embodiments, it is considered that PHICH carriers have the same bandwidth (e.g., the PHICH resource is the same for each PHICH carrier). A case where three parameters (i.e., $n_{carrier}^{PHICH}$, $n_{PHICH}^{GROUP}$, and $n_{PHICH}^{seq}$) have different bandwidths for respective carriers will be considered hereinafter.

$N_{PHICH}(l)$ is defined as the number of PHICH resources in a PHICH carrier having an index l. $n_{carrier}^{PHICH}$ is determined by considering $N_{PHICH}(l)$ and $I_{PRB\_RA}^{lowest\_index}$, i.e., the lowest PRB index of a PUSCH transmitted on a UL carrier having an index k. More specifically, $n_{carrier}^{PHICH}$ can be determined by considering $N_{PHICH}(l)$ and an aggregated PRB index.

$n_{carrier}^{PHICH}$ is set to a maximum value r of a PHICH carrier index l in a situation where a value equal to or less than 0 firsts appears while sequentially subtracting $N_{PHICH}(l)$, i.e., the number PHICH resources having the PHICH carrier index l, from the aggregated PRB index $$I_{aggregated} = \sum_{p=0}^{k-1} N_{RB}^{UL}(p) + I_{PRB\_RA}^{lowest\_index}$$

in an ascending order starting from the lowest value of the PHICH carrier index l. That is, by calculating $$\sum_{p=0}^{k-1} N_{RB}^{UL}(p) + I_{PRB\_RA}^{lowest\_index} - \sum_{l=0}^{r} N_{PHICH}(l)$$

while sequentially increasing the index l, r is set to the value l when a value less than or equal to 0 appears. This can be expressed by Equation 20 below.

$$n_{PHICH}^{carrier} = \begin{cases} 0, & \text{if } 0 \leq \sum_{p=0}^{k-1} N_{RB}^{UL}(p) + I_{PRB\_RA}^{lowest\_index} < N_{PHICH}(0) \\ 1, & \text{if } N_{PHICH}(0) \leq \sum_{p=0}^{k-1} N_{RB}^{UL}(p) + I_{PRB\_RA}^{lowest\_index} < N_{PHICH}(1) \\ \vdots \\ N_{carrier}^{PHICH} - 1, & \text{if } N_{PHICH}(N_{carrier}^{PHICH} - 2) \leq \sum_{p=0}^{k-1} N_{RB}^{UL}(p) + I_{PRB\_RA}^{lowest\_index} < N_{PHICH}(N_{carrier}^{PHICH} - 1) \end{cases}$$ [Equation 20]

Alternatively, $n^{PHICH}_{carrier}$ can be obtained by Equation 21 below.

$$n_{PHICH}^{carrier} = \sum_{l=0}^{N_{carrier}^{PHICH}-1} \text{sgn}\left\{ \left\lfloor \frac{\sum_{p=0}^{k-1} N_{RB}^{UL}(p) + I_{PRB\_RA}^{lowest\_index}}{\sum_{s=0}^{l} N_{PHICH}(s)} \right\rfloor \right\}$$ [Equation 21]

where $\text{sgn}\{x\} = \begin{cases} 1, & \text{if } x > 0 \\ -1 & \text{if } x < 0 \\ 0 & \text{if } x = 0 \end{cases}$ $n^{group}_{PHICH}$ and $n^{seq}_{PHICH}$ can be obtained based on a result of subtracting a total sum of PHICH resources of previous DL PHICH carriers from an aggregated PRB index and adding a cyclic shift index $n^{seq}_{RS}$ of a DM-RS used in PUSCH transmission. This can be expressed by Equation 22 below.

$$n_{PHICH}^{group} = \left( \sum_{p=0}^{k-1} N_{RB}^{UL}(p) + I_{PRB\_RA}^{lowest\_index} - \sum_{u=0}^{n_{PHICH}^{carrier}-1} N_{PHICH}(u) + n_{RS}^{seq} \right) \mod N_{PHICH}^{group}(n_{PHICH}^{carrier}) + I_{PHICH} \cdot N_{PHICH}^{group}(n_{PHICH}^{carrier})$$ [Equation 22]

$$n_{PHICH}^{seq} = \left\{ \left\lfloor \left( \sum_{p=0}^{k-1} N_{RB}^{UL}(p) + I_{PRB\_RA}^{lowest\_index} - \sum_{u=0}^{n_{PHICH}^{carrier}-1} N_{PHICH}(u) \right) / N_{PHICH}^{group}(n_{PHICH}^{carrier}) \right\rfloor + n_{RS}^{seq} \right\} \mod 2N_{SF}^{PHICH}$$

When multiple-codeword transmission is achieved on a UL carrier, three parameters are determined for each codeword. $n^{PHICH}_{carrier}$, $n^{group}_{PHICH}$, and $n^{seq}_{PHICH}$ of Equation 21 to Equation 22 use $N^{seq}_{RS}(v)$, i.e., a cyclic shift index of a DM-RS of a codeword index v, and $n^{PHICH}_{carrier}(v)$, $n^{group}_{PHICH}(v)$, and $n^{seq}_{PHICH}(v)$ can be expressed by Equation 23 below.

$$n_{PHICH}^{carrier}(v) = \begin{cases} 0, & \text{if } 0 \leq \sum_{p=0}^{k-1} N_{RB}^{UL}(p) + I_{PRB\_RA}^{lowest\_index} < N_{PHICH}(0) \\ 1, & \text{if } N_{PHICH}(0) \leq \sum_{p=0}^{k-1} N_{RB}^{UL}(p) + I_{PRB\_RA}^{lowest\_index} < N_{PHICH}(1) \\ \vdots \\ N_{carrier}^{PHICH} - 1, & \text{if } N_{PHICH}(N_{carrier}^{PHICH} - 2) \leq \sum_{p=0}^{k-1} N_{RB}^{UL}(p) + I_{PRB\_RA}^{lowest\_index} < N_{PHICH}(N_{carrier}^{PHICH} - 1) \end{cases}$$ [Equation 23]

$$n_{PHICH}^{carrier}(v) = \sum_{l=0}^{N_{carrier}^{PHICH}-1} \text{sgn}\left\{ \left\lfloor \frac{\sum_{p=0}^{K-1} N_{RB}^{UL}(p) + I_{PRB\_RA}^{lowest\_index}}{\sum_{s=0}^{l} N_{PHICH}(s)} \right\rfloor \right\}$$

where $\text{sgn}\{x\} = \begin{cases} 1, & \text{if } x > 0 \\ -1 & \text{if } x < 0 \\ 0 & \text{if } x = 0 \end{cases}$ $$n_{PHICH}^{group}(v) = \left( \sum_{p=0}^{k-1} N_{RB}^{UL}(p) + I_{PRB\_RA}^{lowest\_index} - \sum_{u=0}^{N_{PHICH}^{carrier}(v)-1} N_{PHICH}(u) + n_{RS}^{seq}(v) \right) \mod N_{PHICH}^{group}(n_{PHICH}^{carrier}(v)) +$$

$$I_{PHICH} \cdot N_{PHICH}^{group}(n_{PHICH}^{carrier}(v))$$

-continued $$n_{PHICH}^{seq}(v) = \left\{ \left[ \left( \sum_{p=0}^{k-1} N_{RB}^{UL}(p) + I_{PRB\_RA}^{lowest\_index} - \sum_{u=0}^{N_{PHICH}^{carrier}(v)-1} N_{PHICH}(u) \right) \middle/ N_{PHICH}^{group}(n_{PHICH}^{carrier}(v)) \right] + n_{RS}^{seq}(v) \right\} \bmod 2N_{SF}^{PHICH}$$

In another embodiment, $n^{PHICH}_{carrier}(v)$ uses Equation 23 above, whereas $n^{group}_{PHICH}(v)$ and $n^{seq}_{PHICH}(v)$ may further include a function f(v) for assigning an offset in addition to $n^{seq}_{RS}(v)$. For example, the function may be f(v)=v or f(v)=α·v. Herein, α is a constant, and may be given by a higher-layer signal. When using the offset function f(v), $n^{group}_{PHICH}(v)$ and $n^{seq}_{PHICH}(v)$ can be expressed by Equation 24 below.

$$n_{PHICH}^{group}(v) = \qquad \text{[Equation 24]}$$

$$\left( \sum_{p=0}^{k-1} N_{RB}^{UL}(p) + I_{PRB\_RA}^{lowest\_index} - \sum_{u=0}^{N_{PHICH}^{carrier}(v)-1} N_{PHICH}(u) + \right.$$

$$\left. n_{RS}^{seq}(v) + f(v) \right) \bmod N_{PHICH}^{group}(n_{PHICH}^{carrier}(v)) +$$

$$I_{PHICH} \cdot N_{PHICH}^{group}(n_{PHICH}^{carrier}(v))$$

$$n_{PHICH}^{seq}(v) =$$

$$\left\{ \left[ \left( \sum_{p=0}^{k-1} N_{RB}^{UL}(p) + I_{PRB\_RA}^{lowest\_index} - \sum_{u=0}^{N_{PHICH}^{carrier}(v)-1} N_{PHICH}(u) \right) \middle/ \right. \right.$$

$$\left. \left. N_{PHICH}^{group}(n_{PHICH}^{carrier}(v)) \right] + \right.$$

$$\left. n_{RS}^{seq}(v) + f(v) \right\} \bmod 2N_{SF}^{PHICH}$$

In another embodiment, $n^{group}_{PHICH}(v)$ and $n^{seq}_{PHICH}(v)$ can be expressed by Equation 25 below, by multiplying a function f(v) for assigning scaling by $n^{seq}_{RS}(v)$ for each codeword index v.

$$n_{PHICH}^{group}(v) = \qquad \text{[Equation 25]}$$

$$\left( \sum_{p=0}^{k-1} N_{RB}^{UL}(p) + I_{PRB\_RA}^{lowest\_index} - \sum_{u=0}^{N_{PHICH}^{carrier}(v)-1} N_{PHICH}(u) + \right.$$

$$\left. n_{PS}^{seq}(v) \cdot f(v) \right) \bmod N_{PHICH}^{group}(n_{PHICH}^{carrier}(v)) +$$

$$I_{PHICH} \cdot N_{PHICH}^{group}(n_{PHICH}^{carrier}(v))$$

$$n_{PHICH}^{seq}(v) =$$

$$\left\{ \left[ \left( \sum_{p=0}^{k-1} N_{RB}^{UL}(p) + I_{PRB\_RA}^{lowest\_index} - \sum_{u=0}^{N_{PHICH}^{carrier}(v)-1} N_{PHICH}(u) \right) \middle/ \right. \right.$$

$$\left. \left. N_{PHICH}^{group}(n_{PHICH}^{carrier}(v)) \right] + n_{RS}^{seq}(v) \cdot f(v) \right\} \bmod 2N_{SF}^{PHICH}$$

The scaling function f(v) can be defined variously. For example, f(v) may be any one of f(v)=v, f(v)=α·v+1, f(v)=α·(v+1), and f(v)=α·v. Herein, α is a constant, and may be given by a higher-layer signal.

The aforementioned embodiments can be implemented separately or in a combined manner. At least one of the embodiments of determining the number $N^{group}_{PHICH}(l)$ of PHICH groups and an embodiment of determining three parameters $n^{PHICH}_{carrier}$, $n^{group}_{PHICH}$ and $n^{seq}_{PHICH}$ or three parameters $n^{PHICH}_{carrier}(v)$, $n^{group}_{PHICH}(v)$, and $n^{seq}_{PHICH}(v)$ may be combined.

<When there is a Mapping Relation Between a UL Carrier and a DL Carrier>

It is assumed in the following description that a mapping relation in which a PHICH carrier and a PUSCH transmission carrier are mapped in a one-to-one or one-to-many manner to each other is predetermined.

Figure 10:
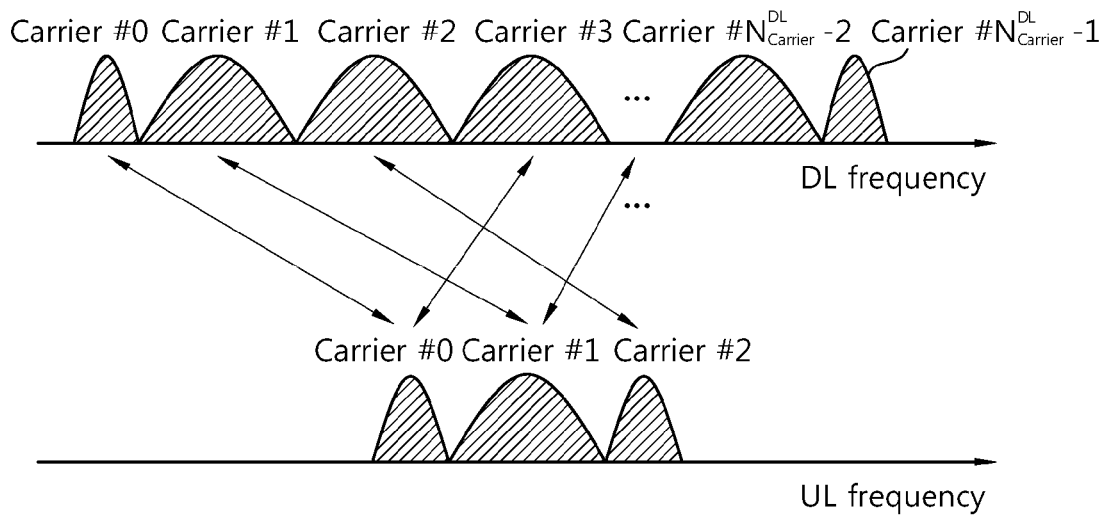
FIG. 10 shows an example of mapping between an uplink carrier and a downlink carrier.

FIG. 10 shows an example of mapping between a UL carrier and a DL carrier. Between a downlink and an uplink, carriers belonging to a link having a greater number of carriers are mapped to carriers of the other link according to an index order. For example, the mapping may follow a mapping rule in which indices of carriers belonging to a link having a greater number of carriers are mapped to indices of carriers belonging to a link having a smaller number of carriers by using a modulo operation.

When an index for $N^{DL}_{carrier}$ DL carriers is denoted by i (i=0, . . . , $N^{DL}_{carrier}-1$) and an index of corresponding $N^{UL}_{carrier}$ UL carriers to be mapped is denoted by j (j=0, . . . , $N^{UL}_{carrier}-1$), the mapping rule can be expressed by Equation 26 below.

$$j = i \% N_{carrier}^{min} \text{ or } j = i \% N_{carrier}^{UL} \qquad \text{[Equation 26]}$$

Figure 11:
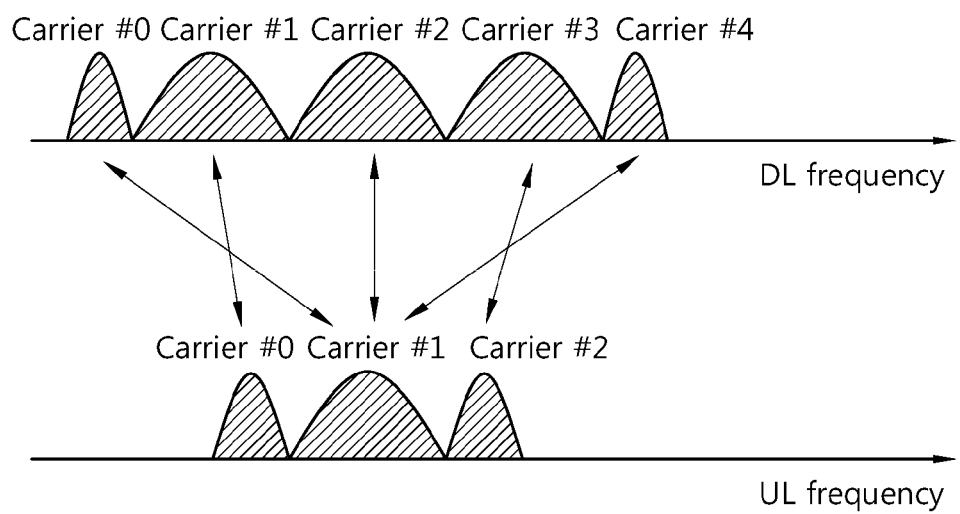
FIG. 11 shows another example of mapping between an uplink carrier and a downlink carrier.

In Equation 26 above, $N^{min}_{carrier}$ is defined by $\min(N^{DL}_{carrier}, N^{UL}_{carrier})$ that returns a smaller value between $N^{DL}_{carrier}$ and $N^{UL}_{carrier}$, and % denotes a modulo operation. FIG. 11 shows another example of mapping between a UL carrier and a DL carrier. Referring to FIG. 11, a carrier index is assigned in an ascending order starting from a carrier belonging to the lowest DL/UL frequency band. When a center carrier is defined as a carrier corresponding to a band to which a center frequency of a system belongs, the carrier is mapped by using the center carrier as a reference carrier in an order starting from a carrier nearest to the reference carrier. This is a suitable method when the number of carriers of each link is odd. In this case, with the center carrier being used as the reference carrier, the number of carriers belonging to a low frequency band is equal to the number of carriers belonging to a high frequency band.

In the example of FIG. 11, the number of DL carriers is 5, and the number of UL carriers is 3. In a downlink, the center carrier (i.e., reference carrier) is a DL carrier #2. In an uplink, the center carrier is a UL carrier #1. First, the DL carrier #2 is mapped to the UL carrier #1. Then, a DL carrier #1 is mapped to a UL carrier #0, and a DL carrier #3 is mapped to a UL carrier #2. DL carriers #0 and #4 are mapped to the UL carrier #1, i.e., the center carrier.

With the center carrier being used as the reference carrier, one-to-one mapping is performed by the number of carriers belonging to a link having a smaller number of allocated carriers between the downlink and the uplink. That is, one-to-one mapping is performed by the number of carriers belonging to a link having a smaller number of carriers. Further, the remaining carriers belonging to a link having a greater number of carriers may be mapped to a center carrier of the link having the smaller number of carriers. Alternatively, the remaining carriers belonging to the link having the greater number of carriers can be sequentially mapped starting from a carrier having the smallest carrier index among carrier indices belonging to the link having the smaller number of carriers, in an ascending order of a carrier index. On the contrary, mapping can also be performed starting from a carrier having the greatest carrier index among carrier indices belonging to the link having the smaller number of carriers in the ascending order of the carrier index.

In another mapping rule, a ratio R of the number of carriers may be defined for carrier mapping, and this ratio may be used in carrier mapping. For example, a DL to UL ratio may be defined as $R_{DL/UL}=N^{DL}_{carrier}/N^{UL}_{carrier}$. Alternatively, a UL to DL ratio may be defined as $R_{UL/DL}=N^{UL}_{carrier}/N^{DL}_{carrier}$. According to the ratio, DL carriers can be respectively mapped to UL carriers. For example, if UL data for a PDCCH received on an $i^{th}$ DL carrier is transmitted on a $j^{th}$ UL carrier, i and j are related as $j=\text{ceil}(R_{UL/DL}*i)$ or $j=\text{floor}(R_{UL/DL}*i)$. Herein, ceil(x) denotes a smallest integer greater than x, and floor(x) denotes a greatest integer less than x. Alternatively, a resource index used for a UL resource and an index of a resource used for the PDCCH may be mapped by being divided for each group according to $R_{DL/UL}$ or $R_{UL/DL}$. Information on the mapping rule may be reported to all UEs in a cell as common information by using a higher-layer signal (e.g., an RRC signal) or an L1/L2 control signal, or may be reported to any UE as UE-specific information. The information may be used by a BS and a UE for resource allocation and indexing for a control channel of a UL carrier and a DL carrier. Irrespective of whether the number of UL carriers and the number of DL carriers are identical to each other, mapping can be configured between the carrier and the DL carrier by using a BS scheduler and/or the higher layer signal (e.g., RRC). A mapping relation configured between the UL carrier and the DL carrier can be applied when the DL carrier for DL PHICH transmission is configured for data transmission on any UL carrier.

Figure 12:
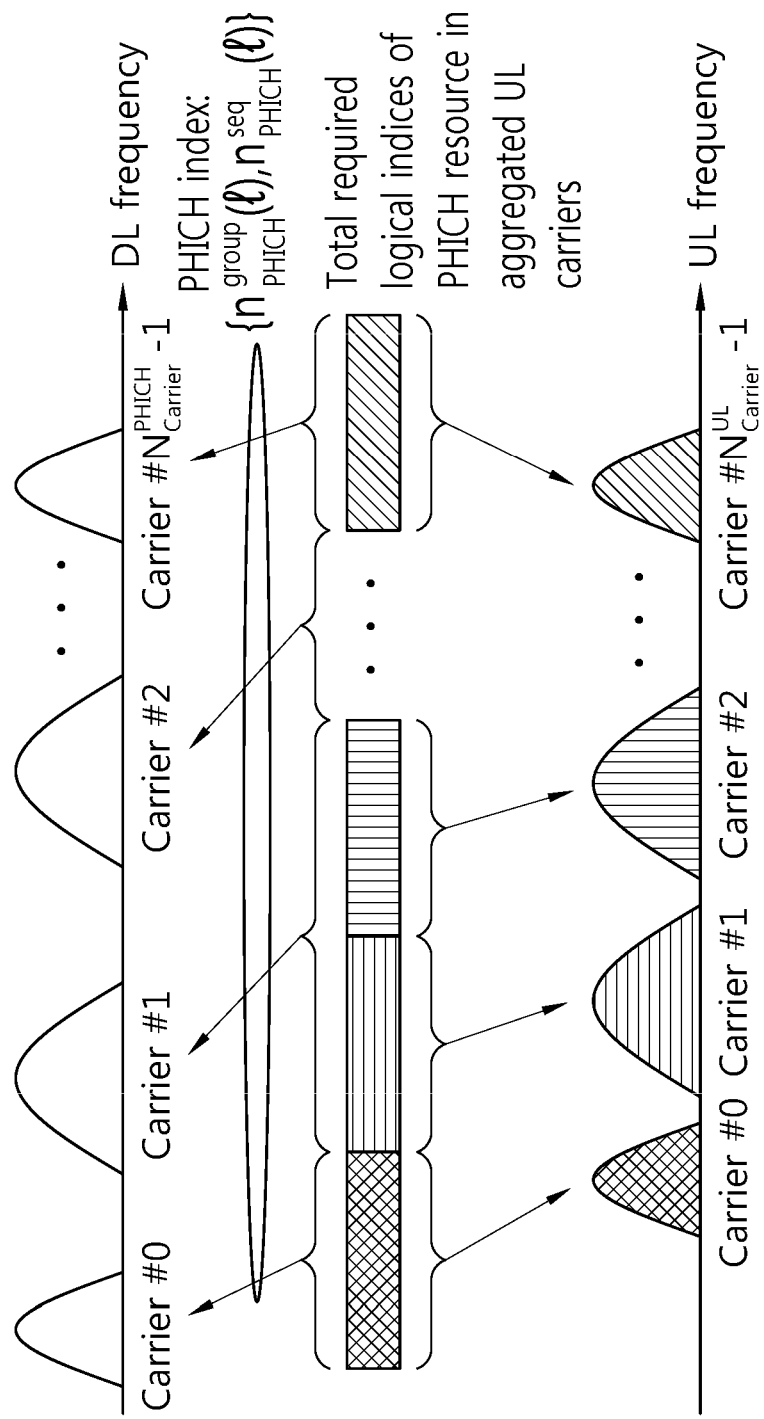
FIG. 12 shows a method of determining a PHICH resource according to an embodiment of the present invention.

FIG. 12 shows a method of determining a PHICH resource according to an embodiment of the present invention. Logical indices are sequentially assigned to RBs capable of PUSCH transmission from each of UL carriers. For example, if a carrier #0 has 10 RBs and a carrier #1 has 5 RBs, logical indices may be assigned from 0 to 14. The logical indices are divided according to UL carriers corresponding to respective PHICH carriers, and a PHICH resource (e.g., the number of PHICH groups) is obtained for each PHICH carrier in a group of the divided logical indices.

A PHICH group index $n^{group}_{PHICH}(l)$ for a PHICH carrier having an index l and a PHICH sequence index $n^{seq}_{PHICH}(l)$ for the PHICH carrier having the index l are obtained based on a PUSCH resource for PHICH indication and a cyclic shift index of a DM-RS. The two parameters, i.e., $n^{group}_{PHICH}(l)$ and $n^{seq}_{PHICH}(l)$, for determining the PHICH resource are referred to as a PHICH index.

When there is a mapping relation between a UL carrier used for PUSCH transmission and a DL carrier used for PHICH transmission, carriers capable of PHICH transmission may respectively correspond to UL carriers to be used for PUSCH transmission. The number of PHICH groups can be obtained based on the total number of PHICH resources required for corresponding PUSCH transmission carriers.

Symbols are defined as follows.

$N^{UL}_{carrier}(l)$: The number of UL carriers corresponding to a PHICH carrier having an index l $c_{UL}(l)$: A logical index of the UL carrier corresponding to the PHICH carrier having the index l. $c_{UL}(l)$ has a value in the range of 0 to $N^{UL}_{carrier}(l)-1$ $N_{RB}(c_{UL}(l))$: The number of RBs capable of PUSCH transmission of a UL carrier having an index $c_{UL}(l)$ or the number of available RBs of a UE for the UL carrier having the index $c_{UL}(l)$ $N^{tot}_{RB}(l)$: The total number of RBs for UL carriers corresponding to the PHICH carrier having the index l. $N^{tot}_{RB}(l)$ is the total number of PHICH resources supportable by the PHICH carrier having the index l, and can be obtained by Equation 27 below.

$$N^{tot}_{RB}(l) = \sum_{c_{UL}(l)=0}^{N^{UL}_{carrier}(l)-1} N_{RB}(c_{UL}(l)) \quad \text{[Equation 27]}$$

In Equation 27 above, $N^{tot}_{RB}(l)$ is only an example, and thus can change variously according to allocation or definition of the RB.

A method of obtaining the number $N^{group}_{PHICH}(l)$ of PHICH groups in the DL carrier having the index l will be described by using the symbols defined above. The number $N^{group}_{PHICH}(l)$ of PHICH groups in the DL carrier having the index l can be obtained by Equation 28 below by using $N^{tot}_{RB}(l)$.

$$N^{group}_{PHICH}(l) = \quad \text{[Equation 28]}$$
$$\begin{cases} \lceil N_g \cdot (N^{tot}_{RB}(l)/8) \rceil & \text{for normal cyclic prefix} \\ 2 \cdot \lceil N_g \cdot (N^{tot}_{RB}(l)/8) \rceil & \text{for extended cyclic prefix} \end{cases}$$

In Equation 28 above, $N_g$ may be provided by a higher-layer signal and used to perform scaling on the number of PHICH groups according to a condition. $N_g$ may be given as an m-bit value. For example, m may have any one of values 2, 3, and 4. In particular, if m=2, backward compatibility with a 3GPP LTE system can be supported.

In another embodiment, there is a case where the number of PHICH groups needs to vary for each DL carrier. For example, this is a case where a bandwidth of a DL carrier is inconsistent, or a bandwidth of a UL carrier is inconsistent. When $N_g(l)$ denotes $N_g$ in the DL carrier having the index l, the number $N^{group}_{PHICH}(l)$ of PHICH groups in the DL carrier having the index l can be obtained by Equation 29 below.

$$N^{group}_{PHICH}(l) = \quad \text{[Equation 29]}$$
$$\begin{cases} \lceil N_g(l) \cdot (N^{tot}_{RB}(l)/8) \rceil & \text{for normal cyclic prefix} \\ 2 \cdot \lceil N_g(l) \cdot (N^{tot}_{RB}(l)/8) \rceil & \text{for extended cyclic prefix} \end{cases}$$

$N_g(l)$ may be reported by the BS to the UE by using a primary carrier as an RRC message or a part of system information. The primary carrier is a DL carrier for transmitting primary control information.

In another embodiment, when multiple-codeword transmission is possible on UL carriers, $N^{group}_{PHICH}(l)$ can be expressed by Equation 30 below, where $N_C$ denotes the number of codewords.

[Equation 30]

$$N^{group}_{PHICH}(l) = \begin{cases} \lceil N_g \cdot (N^{tot}_{RB}(l) \cdot N_C/8) \rceil & \text{for normal cyclic prefix} \\ 2 \cdot \lceil N_g \cdot (N^{tot}_{RB}(l) \cdot N_C/8) \rceil & \text{for extended cyclic prefix} \end{cases}$$

$$N^{group}_{PHICH}(l) = \begin{cases} \lceil N_g(l) \cdot (N^{tot}_{RB}(l) \cdot N_C/8) \rceil & \text{for normal cyclic prefix} \\ 2 \cdot \lceil N_g(l) \cdot (N^{tot}_{RB}(l) \cdot N_C/8) \rceil & \text{for extended cyclic prefix} \end{cases}$$

In Equation 30 above, scaling of $N_g$ may be controlled instead of $N_C$. Alternatively, the number of PHICH groups can be regulated by using a scaling factor $N_g(l)$ based on a value of the DL carrier index l instead of $N_g$. $N_g(l)$ may be reported by the BS to the UE on the primary carrier.

In another embodiment, when a different number of codewords can be transmitted for each UL carrier, the number of PHICH groups for each DL carrier can be obtained by Equation 31 below, where $N_C(l)$ denotes the number of codewords in the carrier having the index l.

[Equation 31]

$$N^{group}_{PHICH}(l) = \begin{cases} \lceil N_g \cdot (N^{tot}_{RB}(l) \cdot N_C(l)/8) \rceil & \text{for normal cyclic prefix} \\ 2 \cdot \lceil N_g \cdot (N^{tot}_{RB}(l) \cdot N_C(l)/8) \rceil & \text{for extended cyclic prefix} \end{cases}$$

$$N^{group}_{PHICH}(l) = \begin{cases} \lceil N_g(l) \cdot (N^{tot}_{RB}(l) \cdot N_C(l)/8) \rceil & \text{for normal cyclic prefix} \\ 2 \cdot \lceil N_g(l) \cdot (N^{tot}_{RB}(l) \cdot N_C(l)/8) \rceil & \text{for extended cyclic prefix} \end{cases}$$

In Equation 31 above, the number of PHICH groups can be regulated by using a scaling factor $N_g(l)$ based on a value of the DL carrier index l instead of $N_g$. $N_g(l)$ may be reported by the BS to the UE on the primary carrier.

The number $n^{group}_{PHICH}(l)$ of PHICH groups in the DL carrier having the index l is essential information that must be known to the UE not only for PHICH reception but also for PDCCH monitoring. Multiple-carrier information that must be obtained by the UE from the BS in the process of initial network entry includes the number of allocated UL carriers, a bandwidth for each carrier, and a center frequency for each carrier. The multiple-carrier information may be reported by the BS to the UE by using a part of system information, a synchronization signal, and/or an RRC message. The multiple-carrier information may be transmitted on a specific carrier (referred to as a reference carrier or a primary carrier). After obtaining the multiple-carrier information from the reference carrier in an initial network entry process or a handover process, the UE may attempt to access to another carrier.

Now, a method of determining the number of PHICH groups on the basis of the number of individual RBs of DL PHICH carriers or the total number of RBs of the DL PHICH carriers will be described.

First, the number of PHICH groups is defined based on the total number of RBs that can be used by available DL carriers. $N^{DL}_{RB\_tot}$, i.e., the total number, of RBs that can be used in a DL, can be obtained by using any one of equations of Equation 32 below.

$$N^{DL}_{RB\_tot} = \sum_{m=0}^{N^{DL}_{carrier}-1} N^{DL}_{RB}(m)$$ [Equation 32]

$$N^{DL}_{RB\_tot} = \sum_{m=0}^{N^{PHICH}_{carrier}-1} N^{DL}_{RB}(m)$$

$$N^{DL}_{RB\_tot} = N^{DL}_{RB}(m_{ref})$$

In Equation 32 above, $N^{PHICH}_{carrier}$ denotes the total number of DL carriers that can be used for PHICH transmission, $N^{DL}_{carrier}$ denotes the total number of DL carriers, m denotes a relative index of a DL carrier, $m_{ref}$ denotes an index of a DL reference carrier, and $N^{DL}_{RB}(m)$ denotes the number of available RBs in a DL carrier.

$N^{DL}_{RB\_tot}(l)$, i.e., the total number of RBs for the DL carrier having the index l, can be obtained by using any one of equations of Equation 33 below.

$$N_{RB}^{DL\_tot}(l) = N_{RB}^{DL}(l)$$

$$N_{RB}^{DL\_tot}(l) = N_{RB\_tot}^{DL}$$

$$N_{RB}^{DL\_tot}(l) = N_{RB\_tot}^{DL}/N_{carrier}^{DL}$$

$$N_{RB}^{DL\_tot}(l) = N_{RB\_tot}^{DL}/N_{carrier}^{PHICH}$$ [Equation 33]

$N^{group}_{PHICH}(l)$, i.e., the number of PHICH groups for the DL carrier having the index l can be obtained by Equation 34 below.

$$N^{group}_{PHICH}(l) =$$ [Equation 34]

$$\begin{cases} \lceil N_g \cdot (N^{DL\_tot}_{RB}(l)/8) \rceil & \text{for normal cyclic prefix} \\ 2 \cdot \lceil N_g \cdot (N^{DL\_tot}_{RB}(l)/8) \rceil & \text{for extended cyclic prefix} \end{cases}$$

In Equation 34 above, $N_g$ may be provided by a higher-layer signal and used to perform scaling on the number of PHICH groups according to a condition. $N_g$ may be given as an m-bit value. For example, m may have any one of values 2, 3, 4, and 5. In particular, if m=2, backward compatibility with a 3GPP LTE system can be supported.

In another embodiment, there is a case where the number of PHICH groups needs to vary for each DL carrier. For example, this is a case where a bandwidth of a DL carrier is inconsistent, or a bandwidth of a UL carrier is inconsistent. In this case, when $N_g(l)$ denotes $N_g$ in the DL carrier having the index l, the number $N^{group}_{PHICH}(l)$ of PHICH groups in the DL carrier having the index l can be obtained by Equation 35 below.

$$N^{group}_{PHICH}(l) =$$ [Equation 35]

$$\begin{cases} \lceil N_g(l) \cdot (N^{DL\_tot}_{RB}(l)/8) \rceil & \text{for normal cyclic prefix} \\ 2 \cdot \lceil N_g(l) \cdot (N^{DL\_tot}_{RB}(l)/8) \rceil & \text{for extended cyclic prefix} \end{cases}$$

$N_g(l)$ may be provided by RRC signaling of a primary carrier or may be signaled by using an RRC signal transmitted in a carrier-specific manner on a DL carrier for PHICH transmission.

In another embodiment, when multiple-codeword transmission is possible on UL carriers, $N^{group}_{PHICH}(l)$ can be expressed by Equation 36 below, where $N_C$ denotes the number of codewords.

[Equation 36]

$$N_{PHICH}^{group}(l) = \begin{cases} \lceil N_g \cdot (N_{RB}^{DL\_tot}(l) \cdot N_C/8) \rceil & \text{for normal cyclic prefix} \\ 2 \cdot \lceil N_g \cdot (N_{RB}^{DL\_tot}(l) \cdot N_C/8) \rceil & \text{for extended cyclic prefix} \end{cases}$$

$$N_{PHICH}^{group}(l) = \begin{cases} \lceil N_g(l) \cdot (N_{RB}^{DL\_tot}(l) \cdot N_C/8) \rceil & \text{for normal cyclic prefix} \\ 2 \cdot \lceil N_g(l) \cdot (N_{RB}^{DL\_tot}(l) \cdot N_C/8) \rceil & \text{for extended cyclic prefix} \end{cases}$$

In Equation 36 above, scaling of $N_g$ may be controlled instead of $N_C$. Alternatively, the number of PHICH groups can be regulated by using a scaling factor $N_g(l)$ based on a value of a DL carrier index l instead of $N_g$. $N_g(l)$ may be reported by the BS to the UE on the primary carrier.

In another embodiment, when a different number of codewords can be transmitted for each UL carrier, the number $N^{group}_{PHICH}(l)$ of PHICH groups for the DL carrier having the index l can be obtained by Equation 37 below, where $N_C(l)$ denotes the number of codewords in the carrier having the index l.

[Equation 37]

$$N_{PHICH}^{group}(l) =$$

$$\begin{cases} \lceil N_g \cdot (N_{RB}^{DL\_tot}(l) \cdot N_C(l)/8) \rceil & \text{for normal cyclic prefix} \\ 2 \cdot \lceil N_g \cdot (N_{RB}^{DL\_tot}(l) \cdot N_C(l)/8) \rceil & \text{for extended cyclic prefix} \end{cases}$$

$$N_{PHICH}^{group}(l) =$$

$$\begin{cases} \lceil N_g(l) \cdot (N_{RB}^{DL\_tot}(l) \cdot N_C(l)/8) \rceil & \text{for normal cyclic prefix} \\ 2 \cdot \lceil N_g(l) \cdot (N_{RB}^{DL\_tot}(l) \cdot N_C(l)/8) \rceil & \text{for extended cyclic prefix} \end{cases}$$

In Equation 37 above, the number of PHICH groups can be regulated by using a scaling factor $N_g(l)$ based on a value of a DL carrier index l instead of $N_g$. $N_g(l)$ may be reported by the BS to the UE on the primary carrier. Hereinafter, a method of obtaining a PHICH group index $n^{group}_{PHICH}(l)$ in a PHICH carrier having an index l for identifying a PHICH resource and a PHICH sequence index $n^{seq}_{PHICH}(l)$ in the PHICH carrier having the index l will be described. It is assumed that a mapping relation exists between a UL carrier and a DL carrier, and the number $N^{group}_{PHICH}(l)$ of PHICH groups for the DL carrier having the index l is predetermined. $n^{group}_{PHICH}(l)$ is used to allocate a logical index by considering an index order of UL carriers corresponding to the PHICH carriers, and is obtained based on a value calculated by adding a sum of the number of available RBs of UL carriers having a lower index than an index $c_{UL}(l)$ of a UL carrier used for PUSCH transmission to the lowest PRB index of a PUSCH allocated to the UL carrier $c_{UL}(l)$ used for current PUSCH transmission (this is referred to as a locally aggregated PRB index). $n^{seq}_{PHICH}(l)$ can be obtained similarly to the method of obtaining $n^{group}_{PHICH}(l)$ described above.

Now, a method of obtaining PHICH indices $n^{group}_{PHICH}(l)$ and $n^{seq}_{PHICH}(l)$ will be described in detail.

A locally aggregated PRB index $$I^{local}_{aggregated} = \sum_{p=0}^{c_{UL}(l)-1} N_{RB}^{UL}(p) + I_{PRB\_RA}^{lowest\_index}$$

is a value calculated by adding a sum of the number of available RBs of UL carriers having a lower index than an index $c_{UL}(l)$ of a UL carrier used for PUSCH transmission to the lowest PRB index $I^{lowest\_index}_{PRB\_RA}$ of a PUSCH allocated to the UL carrier $c_{UL}(l)$ used for current PUSCH transmission. $n^{group}_{PHICH}(l)$ can be obtained based on a result of adding a cyclic shift index $n^{seq}_{RS}$ of a DM-RS to the locally aggregated PRB index.

$n^{group}_{PHICH}(l)$ and $n^{seq}_{PHICH}(l)$ can be obtained by Equation 38 below.

$$n^{group}_{PHICH}(l) = \qquad [\text{Equation 38}]$$

$$\left( \sum_{p=0}^{c_{UL}(l)-1} N_{RB}^{UL}(p) + I_{PRB\_RA}^{lowest\_index} + n_{RS}^{seq} \right) \mod N^{group}_{PHICH}(l) +$$

$$I_{PHICH} \cdot N^{group}_{PHICH}(l)$$

$$n^{seq}_{PHICH}(l) = \left\{ \left\lfloor \frac{\left( \sum_{p=0}^{c_{UL}(l)-1} N_{RB}^{UL}(p) + I_{PRB\_RA}^{lowest\_index} \right)}{N^{group}_{PHICH}(l)} \right\rfloor + n_{RS}^{seq} \right\}$$

$$\mod 2 N^{PHICH}_{SF}$$

In another embodiment, in a case where multiple-codeword transmission is achieved when data is transmitted on a UL carrier, a cyclic shift index of a DM-RS used in each codeword transmission can be mapped differently for each codeword transmission. The cyclic shift index of the DM-RS for each codeword is denoted by $n^{seq}_{RS}(v)$ (where v is a codeword index). In this case, $n^{group}_{PHICH}(l,v)$ and $n^{seq}_{PHICH}(l,v)$ based on the codeword index v can be determined by Equation 39 below.

$$n^{group}_{PHICH}(l, v) = \qquad [\text{Equation 39}]$$

$$\left( \sum_{p=0}^{c_{UL}(l)-1} N_{RB}^{UL}(p) + I_{PRB\_RA}^{lowest\_index} + n_{RS}^{seq}(v) \right) \mod N^{group}_{PHICH}(l) +$$

$$I_{PHICH} \cdot N^{group}_{PHICH}(l)$$

$$n^{seq}_{PHICH}(l, v) = \left\{ \left\lfloor \frac{\left( \sum_{p=0}^{c_{UL}(l)-1} N_{RB}^{UL}(p) + I_{PRB\_RA}^{lowest\_index} \right)}{N^{group}_{PHICH}(l)} \right\rfloor + n_{RS}^{seq}(v) \right\}$$

$$\mod 2 N^{PHICH}_{SF}$$

In another embodiment, $n^{group}_{PHICH}(l,v)$ and $n^{seq}_{PHICH}(l,v)$ may further include a function f(v) for assigning an offset in addition to $n^{seq}_{RS}(v)$. For example, the function may be f(v)=v, f(v)=v+β or f(v)=α·v. Herein, α is a constant, and may be given by a higher-layer signal. β is an offset value for supporting backward compatibility, and may be given by the higher-layer signal. When using the offset function f(v), $n^{group}_{PHICH}(l,v)$ and $n^{seq}_{PHICH}(l,v)$ can be expressed by Equation 40 below.

[Equation 40]

$$n_{PHICH}^{group}(l, v) =$$

$$\left(\sum_{p=0}^{c_{UL}(l)-1} N_{RB}^{UL}(p) + I_{PRB\_RA}^{lowest\_index} + n_{RS}^{seq}(v) + f(v)\right) \mod N_{PHICH}^{group}(l) +$$

$$I_{PHICH} \cdot N_{PHICH}^{group}(l)$$

$$n_{PHICH}^{seq}(l, v) = \left\{\left\lfloor \frac{\left(\sum_{p=0}^{c_{UL}(l)-1} N_{RB}^{UL}(p) + I_{PRB\_RA}^{lowest\_index}\right)}{N_{PHICH}^{group}(l)} \right\rfloor + n_{RS}^{seq}(v) + f(v)\right\}$$

$$\mod 2N_{SF}^{PHICH}$$

In another embodiment, $n^{group}{}_{PHICH}(l,v)$ and $n^{seq}{}_{PHICH}(l, v)$ can be expressed by Equation 41 below, by multiplying a function f(v) for assigning scaling by $n^{seq}{}_{RS}(v)$ for each codeword index v.

[Equation 41]

$$n_{PHICH}^{group}(l, v) = \left(\sum_{p=0}^{c_{UL}(l)-1} N_{RB}^{UL}(p) + I_{PRB\_RA}^{lowest\_index} + n_{RS}^{seq}(v) \cdot f(v)\right) \mod N_{PHICH}^{group}(l) +$$

$$I_{PHICH} \cdot N_{PHICH}^{group}(l)$$

$$n_{PHICH}^{seq}(l, v) = \left\{\left\lfloor \frac{\left(\sum_{p=0}^{c_{UL}(l)-1} N_{RB}^{UL}(p) + I_{PRB\_RA}^{lowest\_index}\right)}{N_{PHICH}^{group}(l)} \right\rfloor + n_{RS}^{seq}(v) \cdot f(v)\right\}$$

$$\mod 2N_{SF}^{PHICH}$$

The scaling function f(v) can be defined variously. For example, f(v) may be any one of f(v)=v, f(v)=v+β, (fv)=α·v+1, f(v)=α·(v+1), and f(v)=α·v. Herein, α is a constant, and may be given by a higher-layer signal. β is an offset value for supporting backward compatibility, and may be given by the higher-layer signal.

The aforementioned embodiments can be implemented separately or in a combined manner. At least one of the embodiments of determining the number $N^{group}{}_{PHICH}(l)$ of PHICH groups and an embodiment of determining three parameters $n^{PHICH}{}_{carrier}(l)$, $n^{group}{}_{PHICH}(l)$, and $n^{seq}{}_{PHICH}(l)$ or three parameters $n^{PHICH}{}_{carrier}(l,v)$, $n^{group}{}_{PHICH}(l,v)$, and $n^{seq}{}_{PHICH}(l,v)$ may be combined.

In addition, any one of embodiments of obtaining the number of PHICH groups and PHICH indices $n^{PHICH}{}_{carrier}$, $n^{group}{}_{PHICH}$, and $n^{seq}{}_{PHICH}$ when there is no mapping relation between a UL carrier and a DL carrier and any one of embodiments of obtaining the number of PHICH groups and PHICH indices $n^{group}{}_{PHICH}$ and $n^{seq}{}_{PHICH}$ when there is a mapping relation between the UL carrier and the DL carrier may be combined.

<UL Channel Resource Allocation and Indexing Method>

First, a PUCCH resource used for DL HARQ will be described.

In a 3GPP LTE system, in an $n^{th}$ subframe, a DL grant is transmitted to a UE on a PDCCH, and DL data is transmitted on a PDSCH indicated by the PDCCH. The UE transmits ACK/NACK on a PUCCH in an $(n+4)^{th}$ subframe. The ACK/NACK is transmitted using a PUCCH format 1a/1b.

According to 3GPP TS 36.211 V8.2.0, a PUCCH format 1/1a/1b is expressed mathematically by Equation 42 below.

[Equation 42]

$$y(n) = d(0) \cdot r_{u,v}^{(\alpha)}(n), n = 0, 1, \ldots, N_{seq}^{PUCCH} - 1, N_{seq}^{PUCCH} = 12$$

$$z(m' \cdot N_{SF}^{PUCCH} \cdot N_{seq}^{PUCCH} + m \cdot N_{seq}^{PUCCH} + n) = S(n_s) \cdot w_{n_{OC}}(m) \cdot y(n)$$

where, $$m = 0, \ldots, N_{SF}^{PUCCH} - 1$$

$$n = 0, \ldots, N_{seq}^{PUCCH} - 1$$

$$m' = 0, 1,$$

$$S(n_s) = \begin{cases} 1 & \text{if } n'(n_s) \bmod 2 = 0 \\ e^{j\pi/2} & \text{otherwise} \end{cases}$$

In Equation 42 above, $N^{PUCCH}{}_{SF}=4$ in case of a normal PUCCH format 1/1a/1b. A resource for transmission of the PUCCH format 1/1a/1b is determined by a resource index $n^{(l)}{}_{PUCCH}$, a CS amount $\alpha(n_s, 1)$ of a basis sequence, and an orthogonal sequence index $n_{OC}(n_s)$. The CS amount $\alpha(n_s, 1)$ of the basis sequence and the orthogonal sequence index $n_{OC}(n_s)$ are determined by Equation 43 below.

[Equation 43]

$$n_{oc}(n_s) = \begin{cases} \lfloor n'(n_s) \cdot \Delta_{shift}^{PUCCH} / N' \rfloor & \text{for normal cyclic prefix} \\ 2 \cdot \lfloor n'(n_s) \cdot \Delta_{shift}^{PUCCH} / N' \rfloor & \text{for extended cyclic prefix} \end{cases}$$

$$\alpha(n_s, l) = 2\pi \cdot n_{cs}(n_s, l) / N_{sc}^{RB}$$

$$n_{cs}(n_s, l) =$$

$$\begin{cases} \left[\begin{pmatrix} n_{cs}^{cell}(n_s, l) + \\ \left(n'(n_s) \cdot \Delta_{shift}^{PUCCH} + \delta_{offset}^{PUCCH} + \\ (n_{oc}(n_s) \bmod \Delta_{shift}^{PUCCH})\right) \bmod N' \end{pmatrix}\right] \bmod N_{sc}^{RB} & \text{for normal cyclic prefix} \\ \left[\begin{pmatrix} n_{cs}^{cell}(n_s, l) + \\ \left(n'(n_s) \cdot \Delta_{shift}^{PUCCH} + \delta_{offset}^{PUCCH} + \\ n_{oc}(n_s)/2 \right) \bmod N' \end{pmatrix}\right] \bmod N_{sc}^{RB} & \text{for extended cyclic prefix} \end{cases}$$

where $$N' = \begin{cases} N_{cs}^{(1)} & \text{if } n_{PUCCH}^{(1)} < c \cdot N_{cs}^{(1)} / \Delta_{shift}^{PUCCH} \\ R_{sc}^{RB} & \text{otherwise} \end{cases}$$

$$c = \begin{cases} 3 & \text{normal cyclic prefix} \\ 2 & \text{extended cyclic prefix} \end{cases}$$

$$n'(n_s) =$$

$$\begin{cases} n_{PUCCH}^{(1)} & \text{if } n_{PUCCH}^{(1)} < \frac{c \cdot N_{cs}^{(1)}}{\Delta_{shift}^{PUCCH}} \\ \left(\frac{n_{PUCCH}^{(1)} - c \cdot N_{cs}^{(1)}}{\Delta_{shift}^{PUCCH}}\right) \bmod \left(\frac{c \cdot N_{sc}^{RB}}{\Delta_{shift}^{PUCCH}}\right) & \text{otherwise,} \end{cases} \quad \begin{array}{l} \text{for } n_s \\ \bmod 2 = 0 \end{array}$$

-continued $$n'(n_s) = \begin{cases} [c(n'(n_s-1)+1)] & n_{PUCCH}^{(1)} \geq \\ \mod\left(\frac{cN_{sc}^{RB}}{\Delta_{shift}^{PUCCH}}+1\right)-1 & \frac{c \cdot N_{cs}^{(1)}}{\Delta_{shift}^{PUCCH}} \quad \text{for } n_s\mod 2 = 1 \\ \left\lfloor\frac{h}{c}\right\rfloor + (h\mod c)\frac{N'}{\Delta_{shift}^{PUCCH}} & \text{otherwise,} \end{cases}$$

where $$h = (n'(n_s-1)+d)\mod\left(\frac{cN'}{\Delta_{shift}^{PUCCH}}\right),$$

with $d = 2$ for normal CP and $d = 0$ for extended CP.

The quantities $$\Delta_{shift}^{PUCCH} \in \begin{cases} \{1, 2, 3\} & \text{for normal cyclic prefix} \\ \{1, 2, 3\} & \text{for extended cyclic prefix} \end{cases} \text{ are set by higher layers.}$$

$$\delta_{offset}^{PUCCH} \in \{0, 1, \ldots, \Delta_{shift}^{PUCCH} - 1\}$$

A resource index $n^{(1)}_{PUCCH}$ for HARQ ACK/NACK is obtained as shown in Table 3 below, which is disclosed in the section 10.1 of 3GPP TS 36.213 V8.3.0 (2008-05).

TABLE 3 for a dynamically scheduled PDSCH indicated by the detection of a corresponding PDCCH with DCI format 1A/1/2 in subframe n − 4, the UE shall use $n_{PUCCH}^{(1)} = n_{CCE} + N_{PUCCH}^{(1)}$, where $n_{CCE}$ is the number of the first CCE used for transmission of the corresponding DCI assignment and $N_{PUCCH}^{(1)}$ is configured by higher layers.
for a semi-persistently scheduled PDSCH transmission and where there is not a corresponding DCI detected in subframe n − 4, the value of $n_{PUCCH}^{(1)}$ is configured by higher layers.

That is, according to the above description, ACK/NACK is sent in an $(n+4)^{th}$ subframe with respect to DL data transmitted in an $n^{th}$ subframe which is dynamically scheduled.

When the ACK/NACK is sent using the PUCCH format 1a/1b, a physical RB index $n_{PRB}$ is determined by $n^{(1)}_{PUCCH}$. According to the section 5.4.3 of 3GPP TS 36.211 V8.2.0, the physical RB index $n_{PRB}$ is determined by Equation 44 below.

[Equation 44]

$$m = \begin{cases} N_{RB}^{(2)} & \text{if } n_{PUCCH}^{(1)} < c \cdot N_{cs}^{(1)}/\Delta_{shift}^{PUCCH} \\ \left\lfloor\frac{n_{PUCCH}^{(1)} - c \cdot N_{cs}^{(1)}/\Delta_{shift}^{PUCCH}}{c \cdot N_{sc}^{RB}/\Delta_{shift}^{PUCCH}}\right\rfloor + & \text{otherwise} \\ N_{RB}^{(2)} + \left\lceil\frac{N_{cs}^{(1)}}{8}\right\rceil \end{cases}$$

$$c = \begin{cases} 3 & \text{normal cyclic prefix} \\ 2 & \text{extended cyclic prefix} \end{cases}$$

$$n_{PRB} = \begin{cases} \left\lfloor\frac{m}{2}\right\rfloor & \text{if } (m+n_s\mod 2)\mod 2 = 0 \\ N_{RB}^{UL} - 1 - \left\lfloor\frac{m}{2}\right\rfloor & \text{if } (m+n_s\mod 2)\mod 2 = 1 \end{cases}$$

The aforementioned PUCCH format 1a/1b is configured based on the last CCE index of a PDCCH, and does not consider multiple carriers. When PDSCH/PDCCH are transmitted on a plurality of DL carriers, and PUCCH/PUSCH are transmitted on a plurality of UL carriers, a method of allocating a PUCCH resource is proposed as follows.

If the number of UL carriers that can be used by the UE for UL transmission is equal to the number of DL carriers, the DL carriers and the UL carriers can be mapped in a one-to-one or one-to-many manner. For example, if an index i of DL carriers is constructed in an order from a low frequency to a high frequency and an index j of UL carriers is also configured likewise, then DL carriers and UL carriers having the same index can be mapped. Alternatively, it is also possible to map an index i sorted in an ascending order and an index k sorted in a descending order. Alternatively, symmetrical mapping is also possible with a center frequency being located in the center. Alternatively, the DL carriers and the UL carriers may be mapped by using a cell-specific message or a UE-specific RRC signal or PDCCH signaling. A PUCCH resource can be determined based on the lowest CCE index used in a PDCCH indicating PDSCH transmission of the DL carriers mapped using the aforementioned method.

Irrespective of the number of UL carriers or DL carriers, a single logical basis CCE stream is configured by combining a CCE index for each DL carrier for PDCCH transmission in an order of DL carriers with respect to all carriers capable of PDSCH transmission, and the single logical index is allocated by using a DL carrier index for PDSCH transmission on the basis CCE stream and a CCE index in the DL carrier. In addition, the logical index is evenly or unevenly allocated on the basis CCE stream with respect to UL carriers capable of transmission ACK/NACK on a PUCCH or a PUSCH. Alternatively, some carriers may be selected and grouped from a plurality of UL carriers, and a PUCCH resource may be allocated for PDSCH transmission with respect to an index of UL carriers in a group.

When a mapping relation exists between a DL carrier and a UL carrier, one group of all logical CCE streams may be configured by summing up CCE indices with respect to all DL carriers capable of PDSCH transmission, and an index on the all CCE streams may be allocated by using a carrier index for PDSCH transmission on all logical CCE streams and a CCE index in the carrier. With respect to the all CCE streams, a PUCCH resource may be allocated using CCE index-based channel allocation on the PUSCH or PUSCH channel allocation based on a UL grant.

When a plurality of ACK/NACK signals are transmitted by the UE on a UL carrier according to the number of DL carriers to be transmitted, the plurality of ACK/NACK signals are transmitted by using: (1) a plurality of existing PUCCHs; (2) a single PUCCH with a new format; or (3) a PUSCH. In the case (3), the ACK/NACK may be transmitted by puncturing frequency resources of OFDM symbols located near a DM-RS, or may be transmitted by using time-first-mapping, or may be transmitted in the same method as typical PUSCH, transmission by using a modulation and coding scheme of a shared channel. Channel allocation/multiplexing and channel indexing for UL channels such as a PUCCH for carrying a UL control signal (e.g., ACK/NACK, a channel quality indicator (CQI), a precoding matrix index (PMI), a rank indication (RI), etc.) and a scheduling request channel may be configured or signaled by using a higher-layer signal. In a multiple-carrier system, a UL carrier used for transmission of a UL control channel and a DL carrier in association therewith may be reported by the BS to the UE by using the higher-layer signal or L1/L2 control signaling.

3GPP LTE reports a size of a control region for PDCCH transmission, i.e., the number of OFDM symbols occupied by the control region, on a PCFICH. A maximum size of the control region is 3 OFDM symbols at present. Accordingly, a PHICH duration n indicating the number of OFDM symbols used in a PHICH to be mapped to the control region also indicates a value up to 3. Specifically, if n=3, the size corresponds to 1 or 3 OFDM symbols, and if n=2, the size corresponds to 1 or 2 OFDM symbols.

However, system capacity may be restricted due to limitation of the currently available control region for PDCCH transmission. Therefore, there is an ongoing negotiation for increasing the size of the control region up to 4 OFDM symbols.

When the size of the control region is 4, if the PHICH is limited to 3 OFDM symbols as in the conventional method, it may result in system performance deterioration. This is because the increasing of power of the PHICH to improve PHICH reliability may result in a difference in transmit power for each OFDM symbol of a PDCCH, which may lead to deterioration of PDCCH detection performance. Therefore, a new PHICH duration needs to be set when the control region occupies 4 OFDM symbols.

In one example, if a value transmitted on a PCFICH corresponds to 4 OFDM symbols, a PHICH duration transmitted on a BCH may have a value corresponding to 1 or 4 OFDM symbols. In another example, if the value transmitted on the PCFICH corresponds to 4 OFDM symbols, the PHICH duration transmitted on the BCH may have only a value corresponding to 4 OFDM symbols. In another example, if the value transmitted on the PCFICH corresponds to 4 OFDM symbols, the PHICH duration transmitted on the BCH may have a value corresponding to 3 OFDM symbols. In another example, if the value transmitted on the PCFICH corresponds to 4 OFDM symbols, the PHICH duration may be Set according to a condition such as a system bandwidth or the like.

Figure 13:
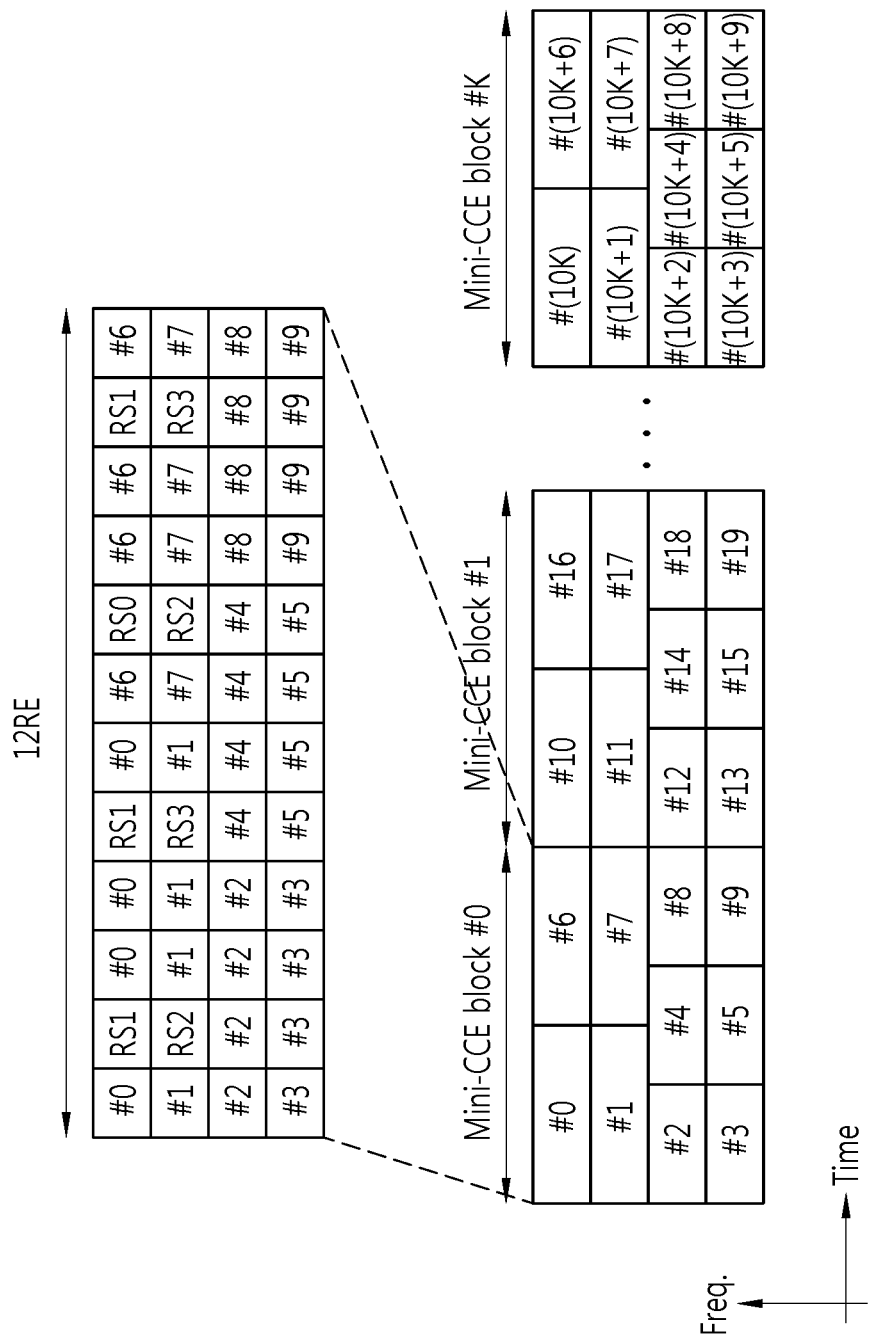
FIG. 13 shows indexing of a PHICH resource when a control region occupies 4 orthogonal frequency division multiplexing (OFDM) symbols.

FIG. 13 shows indexing of a PHICH resource when a control region occupies 4 OFDM symbols. The control region consists of 12 subcarriers and 4 OFDM symbols. With respect to a plurality of resource element groups (REGs) in the control region, indexing is first achieved on each REG in a time axis and then indexing is achieved on the REG in a frequency axis. The REG includes 4 contiguous resource elements (REs). In FIG. 13, "RS" indicated in the RE denotes a reference signal, and one REG is denoted by the same number (i.e., #0, #1, #2, ... ). A mini CCE block consists of 10 REGs. Such a method has an advantage in that backward compatibility with an LTE UE can be maintained since indexing on the REG is performed while maintaining the conventional time-first manner.

Figure 14:
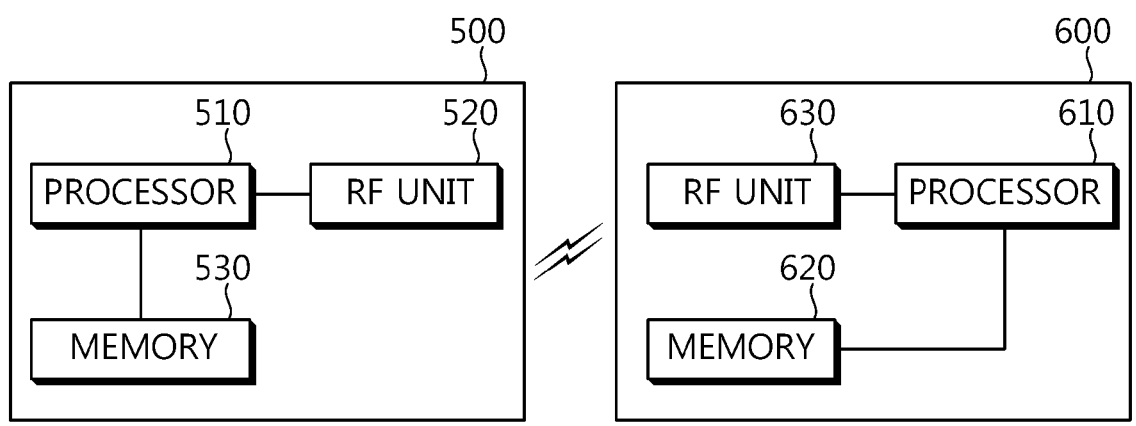
FIG. 14 is a block diagram showing a wireless communication system for implementing an embodiment of the present invention.

FIG. 14 is a block diagram showing a wireless communication system for implementing an embodiment of the present invention. A BS 500 includes a processor 510, a memory 530, and a radio frequency (RF) unit 520. The processor 510 supports HARQ, configures a PHICH, and sends ACK/NACK on the configured PHICH. The processor 510 can implement procedures, methods, and functions performed by the BS in the aforementioned embodiments. The memory 530 is coupled to the processor 510, and stores a variety of information for driving the processor 510. The RF unit 520 is coupled to the processor 510, and transmits and/or receives a radio signal.

A UE 600 includes a processor 610, a memory 620, and an RF unit 630. The processor 610 supports HARQ, sends UL data, and determines a PHICH index for identifying a PHICH. The processor 610 can implement procedures, methods, and functions performed by the UE in the aforementioned embodiments. The memory 620 is coupled to the processor 610, and stores a variety of information for driving the processor 610. The RF unit 630 is coupled to the processor 610, and transmits and/or receives a radio signal.

The processors 510 and 610 may include an application-specific integrated circuit (ASIC), a separate chipset, a logic circuit, and/or a data processing unit. The memories 520 and 620 may include a read-only memory (ROM), a random access memory (RAM), a flash memory, a memory card, a storage medium, and/or other equivalent storage devices. The RF units 530 and 630 may include a base-band circuit for processing a radio signal. When the embodiment of the present invention is implemented in software, the aforementioned methods can be implemented with a module (i.e., process, function, etc.) for performing the aforementioned functions. The module may be stored in the memories 520 and 620 and may be performed by the processors 510 and 610. The memories 520 and 620 may be located inside or outside the processors 510 and 610, and may be coupled to the processors 510 and 610 by using various well-known means.

Although a series of steps or blocks of a flowchart are described in a particular order when performing methods in the aforementioned exemplary system, the steps of the present invention are not limited thereto. Thus, some of these steps may be performed in a different order or may be concurrently performed. Those skilled in the art will understand that these steps of the flowchart are not exclusive, and that another step can be included therein or one or more steps can be omitted without having an effect on the scope of the present invention.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of performing hybrid automatic repeat request (HARQ) of a user equipment (UE) in a multiple-carrier system, the method comprising:
   transmitting uplink data on an uplink carrier; and
   receiving acknowledgement (ACK)/not-acknowledgement (NACK) for the uplink data on a downlink carrier associated with the uplink carrier, wherein the downlink carrier is associated on the basis of an index of the uplink carrier, a radio resource used for transmission of the uplink data, and a demodulation reference signal (DM-RS) applied to the uplink data,
   wherein the downlink carrier is identified by an index determined based on a value calculated by dividing a logical index for the total sum of resource blocks of all uplink carriers by the number of all downlink carriers.

2. The method of claim 1, wherein the uplink data is transmitted on a physical uplink shared channel (PUSCH) of the uplink carrier, and the ACK/NACK is transmitted on a physical hybrid-ARQ indicator channel (PHICH) of the downlink carrier.

3. The method of claim 2, wherein a PHICH resource used for transmission of the ACK/NACK is identified by a PHICH group index for the downlink carrier and a sequence index for a PHICH group indicated by the PHICH group index, and the PHICH group index and the sequence index are determined based on the lowest physical resource block index used for transmission of the PUSCH and a cyclic shift index of a DM-RS used for transmission of the PUSCH.

4. A user equipment (UE) comprising:
a radio frequency (RF) unit for transmitting and receiving a radio signal; and
a processor coupled to the RF unit,
   wherein the processor is configured for:
   transmitting uplink data on an uplink carrier; and
   receiving acknowledgement (ACK)/not-acknowledgement (NACK) for the uplink data on a downlink carrier associated with the uplink carrier, wherein the downlink carrier is associated on the basis of an index of the uplink carrier, a radio resource used for transmission of the uplink data, and a demodulation reference signal (DM-RS) applied to the uplink data,
   wherein the downlink carrier is identified by an index determined based on a value calculated by dividing a logical index for the total sum of resource blocks of all uplink carriers by the number of all downlink carriers.

* * * * *